US011938919B2

(12) United States Patent
Terai

(10) Patent No.: US 11,938,919 B2
(45) Date of Patent: Mar. 26, 2024

(54) TRANSMISSION MODE CONTROL SYSTEM

(71) Applicant: SUBARU CORPORATION, Tokyo (JP)

(72) Inventor: Koichiro Terai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/334,737

(22) Filed: Jun. 14, 2023

(65) Prior Publication Data

US 2024/0001904 A1   Jan. 4, 2024

(30) Foreign Application Priority Data

Jul. 4, 2022   (JP) .................... 2022-107725

(51) Int. Cl.
*B60W 10/10* (2012.01)
*B60W 30/182* (2020.01)
*B60W 40/06* (2012.01)
*B60W 50/08* (2020.01)
*F16H 59/02* (2006.01)
(Continued)

(52) U.S. Cl.
CPC .......... *B60W 10/10* (2013.01); *B60W 30/182* (2013.01); *B60W 40/06* (2013.01); *B60W 50/082* (2013.01); *B60W 2050/0083* (2013.01); *B60W 2540/12* (2013.01); *F16H 59/02* (2013.01); *F16H 2059/0221* (2013.01); *F16H 2059/0239* (2013.01); *F16H 2059/0247* (2013.01); *F16H 61/02* (2013.01)

(58) Field of Classification Search
CPC .. F16H 61/02; F16H 59/02; F16H 2059/0221; F16H 2059/0239; F16H 2059/0247; B60W 10/10; B60W 30/182; B60W 40/06; B60W 50/082; B60W 2050/0083; B60W 2540/12
See application file for complete search history.

(56) References Cited

U.S. PATENT DOCUMENTS

2007/0099751 A1* 5/2007 Terayama ............... F16H 61/16
477/34
2007/0099752 A1* 5/2007 Saito ................... F16H 61/0213
477/34
(Continued)

FOREIGN PATENT DOCUMENTS

JP      2008-051262 A    3/2008

*Primary Examiner* — Tinh Dang
(74) *Attorney, Agent, or Firm* — Rimon, P.C.

(57) ABSTRACT

A transmission mode control system includes a control device that controls a transmission mode of a vehicle and a first input device that accepts a switching operation of switching from an automatic transmission mode to a manual transmission mode. The control device includes a processor and a memory. The processor executes a process including: switching the transmission mode from the manual transmission mode to the automatic transmission mode when a switching time elapses after an operation of the first input device by a driver of the vehicle; and extending the switching time by a set time when the driver performs, within a post-switching determination time after the switching time elapses, a certain operation that causes a gear ratio to change in the same direction as a change of gear ratio when the gear shift is executed in response to the operation by the driver before the switching time elapses.

8 Claims, 11 Drawing Sheets

(51) Int. Cl.
*F16H 61/02* (2006.01)
*B60W 50/00* (2006.01)

(56) References Cited

U.S. PATENT DOCUMENTS

2017/0315550 A1* 11/2017 Ichikawa .......... B60W 60/0051
2021/0053590 A1* 2/2021 Namba ................ B60N 2/0272

* cited by examiner

… (1) (2) …

TRANSMISSION MODE CONTROL SYSTEM

CROSS-REFERENCE TO RELATED APPLICATIONS

The present application claims priority from Japanese Patent Application No. 2022-107725 filed on Jul. 4, 2022, the entire contents of which are hereby incorporated by reference.

BACKGROUND

The disclosure relates to a transmission mode control system.

In the related art, some automatic transmissions installed in vehicles have automatic and manual transmission modes. In the automatic transmission mode, a gear shift is executed automatically, whereas in the manual transmission mode, a gear shift is executed according to an operation by a driver who drives the vehicle. Also, some of these automatic transmissions have a function configured to automatically switch the transmission mode from automatic to manual upon reaching a predetermined distance. In such automatic transmissions, a technology is known in which the predetermined distance is changed appropriately according to past driver operations. For example, Japanese Unexamined Patent Application Publication No. 2008-51262 discloses a technology in which the predetermined distance is learned and corrected. With this technology, if the driver moves the gear shift lever from the D range position to the DS/M range position within a set time after the transmission is automatically returned to the automatic mode, the condition of the automatic return, that is, the predetermined distance, is increased.

SUMMARY

An aspect of the disclosure provides a transmission mode control system to be applied to a vehicle. The transmission mode control system includes a control device and a first input device. The control device is configured to control a transmission mode of the vehicle. The first input device is configured to accept a switching operation of switching the transmission mode from an automatic transmission mode, in which a gear shift is executed automatically, to a manual transmission mode, in which a gear shift is executed according to an operation by a driver who drives the vehicle. The control device includes a processor and a memory coupled to the processor. The processor is configured to execute a process including: switching the transmission mode from the manual transmission mode to the automatic transmission mode when a switching time set as a switching condition elapses after an operation of the first input device by the driver; and extending the switching time by a set time when the driver performs a certain operation within a post-switching determination time after the switching time elapses. The certain operation causes a gear ratio to change in the same direction as a change of gear ratio when the gear shift is executed in response to the operation by the driver before the switching time elapses.

An aspect of the disclosure provides a transmission mode control system to be applied to a vehicle. The transmission mode control system includes a control device, a first input device, and a brake input device. The control device is configured to control a transmission mode of the vehicle. The first input device is configured to accept a switching operation of switching the transmission mode from an automatic transmission mode, in which a gear shift is executed automatically, to a manual transmission mode, in which a gear shift is executed according to an operation by a driver who drives the vehicle. The brake input device is configured to accept an operation by the driver for reducing a speed of the vehicle. The control device includes a processor and a memory coupled to the processor. The processor is configured to execute a process including: executing the gear shift to a lower speed according to an operation by the driver in the manual transmission mode; switching the transmission mode from the manual transmission mode to the automatic transmission mode when a switching time set as a switching condition elapses after the gear shift is executed; and extending the switching time by a set time when the driver operates the brake input device within a post-switching determination time after the switching time elapses.

An aspect of the disclosure provides a transmission mode control system to be applied to a vehicle. The transmission mode control system includes a control device, a first input device, and a second input device. The control device configured to control a transmission mode of the vehicle. The first input device is configured to accept a switching operation of switching the transmission mode from an automatic transmission mode, in which a gear shift is executed automatically, to a manual transmission mode, in which a gear shift is executed according to an operation by a driver who drives the vehicle. The second input device configured to accept a switching operation of switching the transmission mode from the manual transmission mode to the automatic transmission mode. The control device includes a processor and a memory coupled to the processor. The processor is configured to execute a process including: switching the transmission mode from the manual transmission mode to the automatic transmission mode when a switching time set as a switching condition elapses after an operation of the first input device by the driver; and updating the switching time to a set cancel time shorter than the switching time when the driver performs a certain cancel operation multiple times within an erroneous operation determination time shorter than the switching time after the operation of the first input device by the driver. The certain cancel operation is an operation of the second input device by the driver.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

The driver may feel dissatisfied with the timing of the automatic return to automatic transmission in some cases. In one example, the driver manually performs an operation to switch to the manual transmission mode and shifts gears, but the automatic return is performed before the shift to the target gear ratio (shifting gear) can be enacted.

Accordingly, it is desirable to switch transmission modes appropriately.

Hereinafter, embodiments of the disclosure will be described in detail and with reference to the attached drawings. The specific dimensions, materials, numerical values, and the like indicated in the embodiment are merely illustrative examples for making the disclosure easy to understand, and do not limit the disclosure except where specifically indicated. Note that, in this specification and the drawings, elements that have substantially the same function and configuration are denoted with the same reference signs and duplicate description of such elements is omitted. Moreover, elements not directly related to the disclosure are omitted from illustration.

1. Overall Configuration of Vehicle and Transmission Mode Control System

Figure 1:
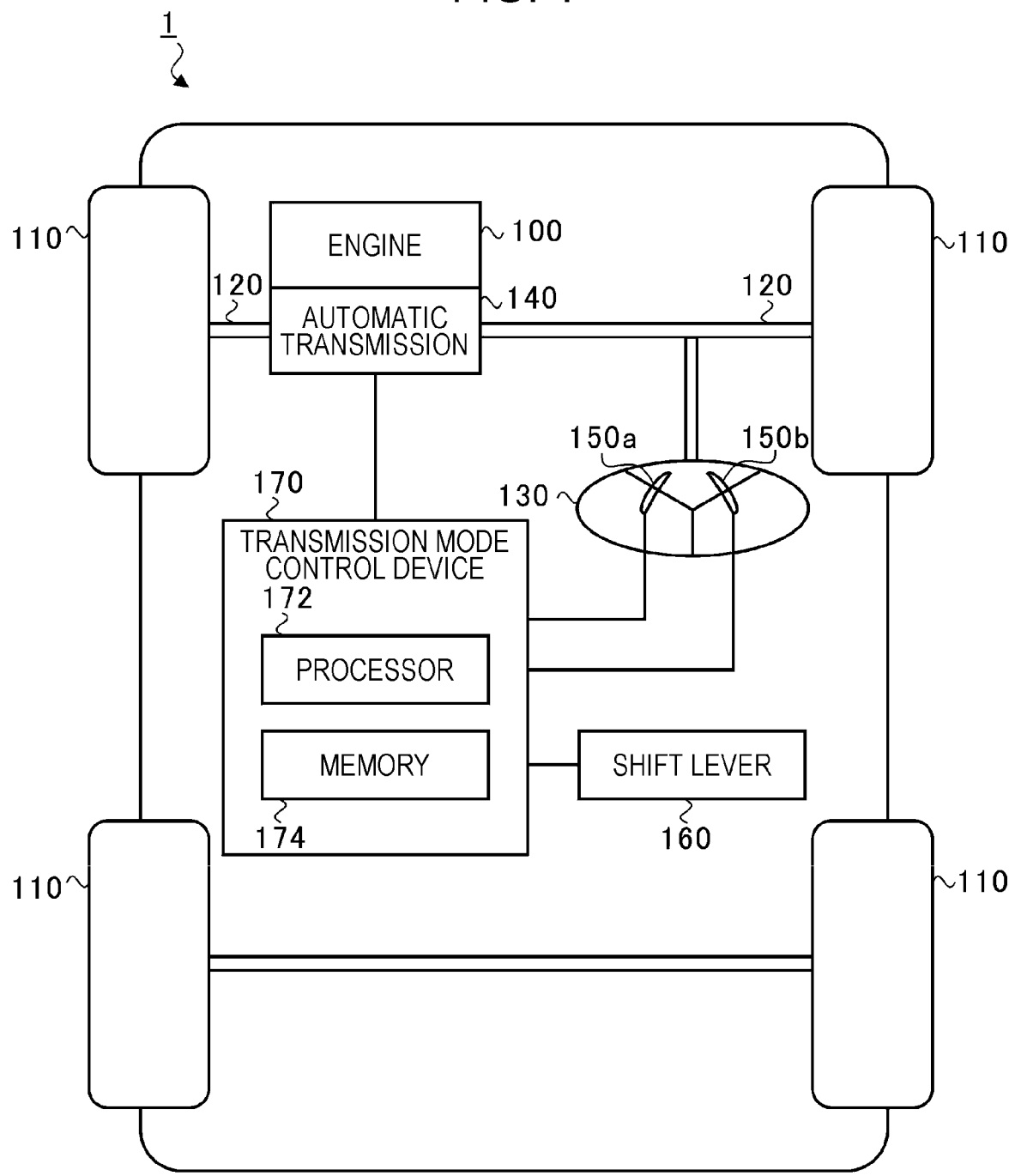
FIG. 1 is a schematic diagram illustrating a vehicle equipped with a transmission mode control system according to an embodiment.

First, FIG. 1 will be referenced to describe an overall configuration of a vehicle 1 equipped with a transmission mode control system according to a first embodiment of the disclosure.

Note that the vehicle 1 according to the present embodiment described below is an example of a vehicle equipped with a transmission mode control system according to an embodiment of the disclosure, but the vehicle to be equipped with a transmission mode control system according to an embodiment of the disclosure is not limited to the following vehicle 1 according to the present embodiment.

FIG. 1 is a schematic diagram illustrating the vehicle 1 equipped with the transmission mode control system according to the embodiment. The vehicle 1 includes an engine 100, drive wheels 110, a drive shaft 120, a steering wheel 130, an automatic transmission 140, a minus paddle switch 150*a*, a plus paddle switch 150*b* (hereinafter, the minus paddle switch 150*a* and plus paddle switch 150*b* may be collectively referred to as the "paddle switches 150"), a shift lever 160, and a transmission mode control device 170.

The engine 100 is the prime mover of the vehicle 1. In the vehicle 1, motive power from the engine 100 is transmitted through the automatic transmission 140 and the drive shaft 120 to the drive wheels 110. The driver is able to steer the vehicle 1 with the steering wheel 130.

The automatic transmission 140 switches transmission ranges provided in the automatic transmission 140 itself according to control commands from the transmission mode control device 170 described later, and thereby converts the rotation rate and torque of the engine 100 to a rotation rate and torque suitable for driving. For example, the automatic transmission 140 may be, but is not limited to, a continuously variable transmission. The automatic transmission 140 may also be a planetary gear step-variable automatic transmission (AT), for example.

The automatic transmission 140 has the following three transmission modes: automatic transmission mode, manual transmission mode (hereinafter referred to as "manual mode"), and temporary manual transmission mode (hereinafter referred to as "temporary manual mode"). In the automatic transmission mode, a gear shift is executed automatically according to predetermined transmission characteristics. In the manual mode, a gear shift is executed according to an operation by the driver. In the temporary manual mode, like the manual mode, a gear shift is executed according to an operation by the driver.

The driver can operate the shift lever 160 described later to switch among the three transmission modes. For example, the driver can switch from the automatic transmission mode to the manual mode by moving the shift lever 160 from a drive range (hereinafter referred to as the "D range") to a manual range (hereinafter referred to as the "M range"). As another example, the driver can switch from the manual mode to the automatic transmission mode by moving the shift lever 160 from the M range to the D range. Also, the driver can switch from the automatic transmission mode to the temporary manual mode by performing a paddle operation on the minus paddle switch 150*a* or the plus paddle switch 150*b* described later with the shift lever 160 in the D range. In one embodiment, the paddle operation may serve as a "switching operation" of switching the transmission mode from the automatic transmission mode to the temporary manual mode.

Moreover, the automatic transmission 140 switches from the temporary manual mode to the automatic transmission mode automatically if a predetermined condition is met. Note that to forcibly switch from the temporary manual mode to the automatic transmission mode at a driver-desired timing, the driver first moves the shift lever 160 from the D range to the M range. Thereafter, the driver can switch from the temporary manual mode to the automatic transmission mode by additionally performing a return operation of moving the shift lever 160 from the M range back to the D range. In one embodiment, the return operation may serve as a "switching operation" of switching the transmission mode from the temporary manual mode to the automatic transmission mode.

In one embodiment, the paddle switches 150 may serve as a "first input device" configured to accept the switching operation of switching the transmission mode from the automatic transmission mode to the temporary manual mode. The paddle switches 150 are located on the opposite side of the steering wheel 130, away from the side that faces the driver's seat. The paddle switches 150 are disposed to be operable by the fingers of the driver while the driver is gripping the steering wheel 130. The minus paddle switch 150*a* and plus paddle switch 150*b* are located on the middle-left and middle-right sides, respectively, of the steering wheel 130. The paddle switches 150 are coupled to the transmission mode control device 170 described later. Upon accepting an operation by the driver, the paddle switches 150 output a signal to the transmission mode control device 170.

The paddle switches 150 accept transmission-related operations by the driver. The driver can change the gear ratio by operating the minus paddle switch 150a or the plus paddle switch 150b. For example, if the driver operates the minus paddle switch 150a, the gear ratio is downshifted to a predetermined gear ratio. If the driver operates the plus paddle switch 150b, the gear ratio is upshifted to a predetermined gear ratio. Moreover, if the transmission mode is the automatic transmission mode when the driver performs the paddle operation, the transmission mode switches to the temporary manual mode.

In one embodiment, the shift lever 160 may serve as a "second input device" configured to accept the switching operation of switching the transmission mode from the temporary manual mode to the automatic transmission mode. To forcibly switch from the temporary manual mode to the automatic transmission mode at a driver-desired timing, the driver performs the return operation with the shift lever 160. The shift lever 160 is located near the driver's seat of the vehicle 1 and accepts driver operations for switching the transmission range of the automatic transmission 140. Besides the D range and M range, the shift lever 160 has a reverse range (hereinafter referred to as the "R range"), a neutral range (hereinafter referred to as the "N range"), and a parking range (hereinafter referred to as the "P range"). Furthermore, the shift lever 160 has an upshift range (hereinafter referred to as the "M(+) range") and a downshift range (hereinafter referred to as the "M(-) range"). When the transmission mode is the manual mode (that is, when the shift lever 160 is positioned in the M range), the driver can move the shift lever 160 to the M(+) range or the M(-) range to upshift or downshift the gear ratio to a predetermined gear ratio.

In one embodiment, the transmission mode control device 170 may serve as a "control device" configured to control the transmission mode. For example, the transmission mode control device 170 controls the transmission mode and the gear ratio of the automatic transmission 140. As illustrated in FIG. 1, the transmission mode control device 170 includes a processor 172 and a memory 174 coupled to the processor 172.

The processor 172 is a computational processing device installed in a computer. The processor 172 is a central processing unit (CPU), for example, but may also be another type of microprocessor. Moreover, the processor 172 may be one or multiple processors. The processor 172 executes a program stored in the memory 174 or another storage medium, causing various processing to be executed in the transmission mode control device 170.

The memory 174 is a storage medium in which programs and various other data are stored. The memory 174 is random access memory (RAM) and read-only memory (ROM), for example. The ROM is non-volatile memory used to store programs to be used by the processor 172, data for running the programs, and the like. The RAM is volatile memory used to temporarily store data such as variables, computational parameters, and computational results to be used in processing executed by the processor 172. A program stored in the ROM is loaded into the RAM and executed by the CPU or other processor 172.

2. Functional Configuration of Transmission Mode Control System

Figure 2:
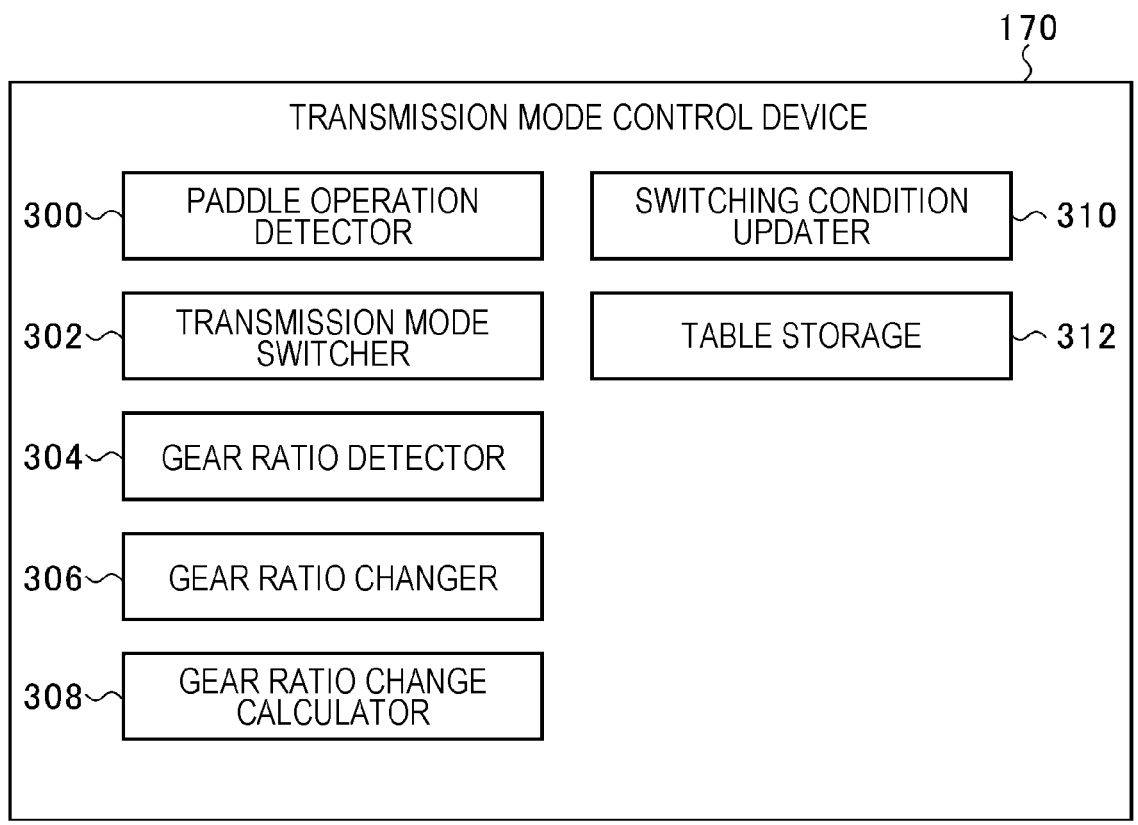
FIG. 2 is a block diagram illustrating an example of the functional configuration of the transmission mode control system according to the embodiment.

Next, FIG. 2 will be referenced to describe a functional configuration of the transmission mode control system according to the embodiment. FIG. 2 is a block diagram illustrating an example of the functional configuration of the transmission mode control system according to the embodiment.

As illustrated in FIG. 2, the transmission mode control device 170 includes a paddle operation detector 300, a transmission mode switcher 302, a gear ratio detector 304, a gear ratio changer 306, a gear ratio change calculator 308, a switching condition updater 310, and table storage 312 as functional units that operate as a result of a program being executed.

The paddle operation detector 300 detects a paddle operation by the driver. For example, if the driver performs a paddle operation, the paddle operation detector 300 receives a signal transmitted from the paddle switches 150 and detects that the paddle operation has been performed. For example, when downshifting the gear ratio while driving, the driver operates the minus paddle switch 150a once. This causes the paddle operation detector 300 to receive a signal transmitted from the minus paddle switch 150a and detect that the minus paddle switch 150a has been operated. Likewise, when upshifting the gear ratio while driving, the driver operates the plus paddle switch 150b once. This causes the paddle operation detector 300 to receive a signal transmitted from the plus paddle switch 150b and detect that the plus paddle switch 150b has been operated. The paddle operation detector 300 receives a signal from the paddle switches 150 for every number of times that a paddle is operated, and detects that the paddle has been operated.

The transmission mode switcher 302 determines whether to switch the transmission mode and switches the transmission mode based on operations of the paddle switches 150 and the shift lever 160 by the driver. For example, if the current transmission mode is the automatic transmission mode and the driver performs a paddle operation, the transmission mode switcher 302 switches the transmission mode from the automatic transmission mode to the temporary manual mode. Also, the transmission mode switcher 302 switches to the automatic transmission mode if the driver moves the shift lever 160 to the D range, and switches to the manual mode if the driver moves the shift lever 160 to the M range. If the current transmission mode is the temporary manual mode and the driver performs the return operation with the shift lever 160, the transmission mode switcher 302 switches to the automatic transmission mode.

Also, if the driver does not perform the return operation, the transmission mode switcher 302 determines whether to switch the transmission mode based on a switching condition on switching the transmission mode. If the switching condition is met, the transmission mode switcher 302 automatically switches the transmission mode from the temporary manual mode to the automatic transmission mode. As described in detail below, one example of the switching condition is that the gear ratio difference due to changing of gear ratio exceeds a switching gear ratio change, that is, a gear ratio change that serves as a switching condition. However, the switching condition is not limited to the above. For example, the switching condition may also be that the elapsed driving time exceeds a predetermined time or that the driving distance exceeds a predetermined distance. The transmission mode switcher 302 whether the gear ratio difference is equal to or greater than the switching gear ratio change, for example. The gear ratio difference is the difference between the gear ratio (hereinafter also referred to as the "first gear ratio") when the transmission mode is to be switched from the automatic transmission mode to the temporary manual mode in response to a paddle operation by the driver and the gear ratio after the gear is switched in response to the operation of the paddle switches 150 by the driver. If the gear ratio difference is equal to or greater than the switching gear ratio change, the transmission mode switcher 302 switches from the temporary manual mode to the automatic transmission mode.

The gear ratio detector 304 detects the current gear ratio. The gear ratio detector 304 detects the current gear ratio based on the number of revolutions of the automatic transmission 140, for example. The gear ratio detector 304 stores the detected gear ratio in the memory 174.

The gear ratio changer 306 derives the target gear ratio after the change and issues a gear ratio changing instruction to the automatic transmission 140. For example, if the transmission mode is the automatic transmission mode, the gear ratio changer 306 references a gear shift map stored in advance in the memory 174, derives an optimal gear shift ratio, and issues a gear ratio changing instruction to the automatic transmission 140. If the transmission mode is the manual mode or the temporary manual mode, the gear ratio changer 306 issues a gear ratio changing instruction to the automatic transmission 140 so that the gears are upshifted or downshifted to a predetermined gear ratio in response to operations of the paddle switches 150 and the shift lever 160 by the driver.

The gear ratio change calculator 308 calculates the gear ratio change. The gear ratio change calculator 308 calculates the gear ratio change, for example. The gear ratio change is the difference between the first gear ratio when the transmission mode is to be switched from the automatic transmission mode to the temporary manual mode in response to the operation of the paddle switches 150 by the driver and the gear ratio (hereinafter also referred to as the "second gear ratio") when the transmission mode is to be switched from the temporary manual mode to the automatic transmission mode in response to the operation of the shift lever 160 by the driver. To calculate the gear ratio change, the gear ratio change calculator 308 continuously calculates the gear ratio difference, for example. The gear ratio difference is the difference between the first gear ratio and the gear ratio detected by the gear ratio detector 304 after the gear ratio has been changed according to an instruction from the gear ratio changer 306. Also, the gear ratio change calculator 308 continuously calculates a unit change, for example. The unit change is the change per unit time in the gear ratio detected by the gear ratio detector 304.

The switching condition updater 310 updates the switching condition on automatically switching the transmission mode. For example, the switching condition updater 310 updates the switching gear ratio change as the switching condition when automatically switching from the temporary manual mode to the automatic transmission mode.

While driving in the temporary manual mode, the driver performs paddle operations to change the gear ratio to a driver-desired gear ratio. Furthermore, if the transmission mode is not switched automatically after the gear ratio has reached the desired gear ratio, the driver manually performs an operation to switch the transmission mode from the temporary manual mode to the automatic transmission mode. That is, the gear ratio obtained when the driver manually performs an operation to switch the transmission mode is the driver-desired gear ratio. In other words, the transmission mode control device 170 can calculate the difference between the first and second gear ratios to determine the gear ratio change with respect to the driver-desired gear ratio. By updating this gear ratio change, the transmission mode control device 170 can subsequently use the gear ratio change as a basis for determining whether the driver-desired gear ratio has been reached.

The switching condition updater 310 updates the switching gear ratio change, which is for automatically switching from the temporary manual mode to the automatic transmission mode, to the gear ratio change calculated by the gear ratio change calculator 308, for example.

The method by which the switching condition updater 310 updates the switching condition may be, for example, a method of updating the switching gear ratio change according to the most recently calculated gear ratio change. With this method, if the driver performs the return operation, the gear ratio change calculated at that timing serves as the switching condition, and thus the return operation is reflected in the switching condition immediately.

The method by which the switching condition updater 310 updates the switching condition is not limited to the above example. As another example, the switching condition updater 310 may calculate the mean of a certain number of the most recently calculated gear ratio changes and update using the calculated mean as the switching gear ratio change. In this case, the switching condition updater 310 weights the stored gear ratio changes so that gear ratio changes stored more recently are prioritized. With this method, the mean of a number of past gear ratio changes is calculated, and thus the switching condition updater 310 can update the switching condition to a more exact gear ratio change desired by the driver. Moreover, the switching condition updater 310 may determine a calculated gear ratio change that is less than a certain value to be an abnormal value, and exclude the abnormal value from inclusion in the updating of the switching condition. The switching condition updater 310 may also perform the update using a certain number of the most recently calculated gear ratio changes according to the first in, first out (FIFO) principle.

The table storage 312 stores various control information, such as a switching condition table related to the switching condition, in the memory 174. In the switching condition table, first gear ratios and switching gear ratio changes are associated, for example. That is, for each first gear ratio, the switching gear ratio change updated by the switching condition updater 310 is stored in the table storage 312.

3. Process Flow by Transmission Mode Control System

Figure 3:
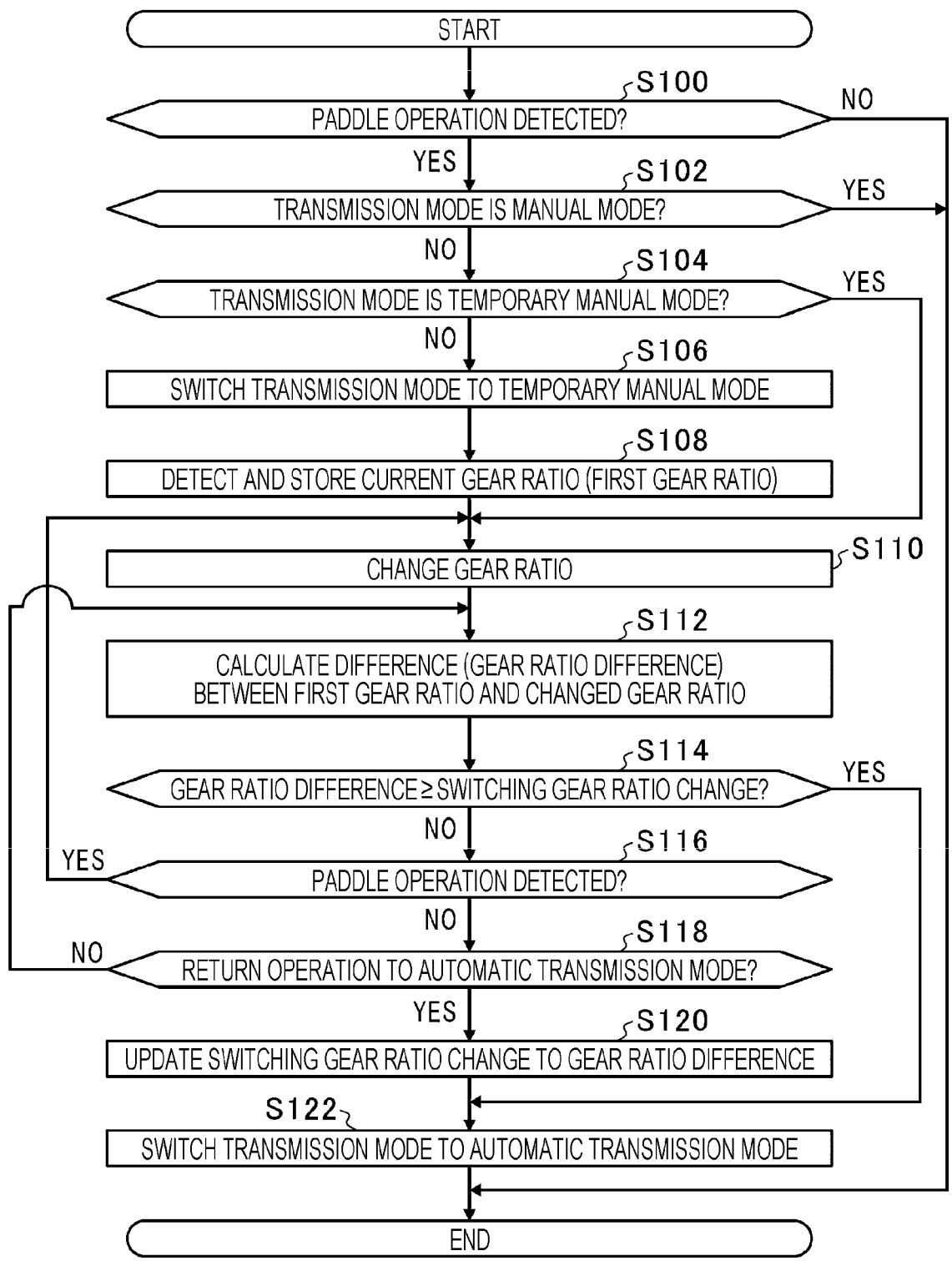
FIG. 3 is a flowchart illustrating a transmission mode switching process by a transmission mode control device according to the embodiment.

Next, FIG. 3 will be referenced to describe a process flow by the transmission mode control device 170 of the transmission mode control system according to the embodiment. FIG. 3 is a flowchart illustrating a transmission mode switching process by the transmission mode control device 170 according to the embodiment.

As illustrated in FIG. 3, first, the paddle operation detector 300 detects whether the driver has performed the paddle operation based on an operation of the paddle switches 150 by the driver (S100). For example, if the driver performs the paddle operation, a signal is transmitted from the paddle switches 150 and the paddle operation detector 300 detects the signal. If the paddle operation detector 300 does not detect the paddle operation (NO in step S100), the transmission mode switching process ends.

If the paddle operation detector 300 detects the paddle operation (YES in step S100), the transmission mode switcher 302 determines whether the current transmission mode is the manual mode (S102). If the current transmission mode is the manual mode (YES in step S102), the transmission mode switching process ends. If the current transmission mode is not the manual mode (NO in step S102), the transmission mode switcher 302 determines whether the current transmission mode is the temporary manual mode (S104).

If the current transmission mode is not the temporary manual mode (NO in step S104), that is, if the current transmission mode is the automatic transmission mode, the transmission mode switcher 302 switches the transmission mode from the automatic transmission mode to the temporary manual mode (S106). Thereafter, the gear ratio detector 304 detects the current gear ratio (first gear ratio) based on, among other things, the number of revolutions of the automatic transmission 140. The gear ratio detector 304 stores the detected current gear ratio in the memory 174 (S108).

After the current gear ratio is stored in step S108, or if the current transmission mode is the temporary manual mode in step S104 (YES in step S104), the gear ratio changer 306 issues a gear ratio changing instruction to the automatic transmission 140 based on the paddle operation by the driver (S110). If the driver operated the minus paddle switch 150a, the gear ratio changer 306 issues a gear ratio changing instruction to the automatic transmission 140 to downshift the gear ratio. If the driver operated the plus paddle switch 150b, the gear ratio changer 306 issues a gear ratio changing instruction to the automatic transmission 140 to upshift the gear ratio.

After the gear ratio is changed, the gear ratio change calculator 308 detects the actual gear ratio after the change in step S110 and calculates the gear ratio difference (S112). The gear ratio difference is the difference between the gear ratio stored in step S108 and the actual gear ratio after the change in step S110.

After the gear ratio difference is calculated in step S112, the transmission mode switcher 302 determines whether the gear ratio difference calculated in step S112 is equal to or greater than the switching gear ratio change (S114). An initial value is set for the switching gear ratio change, for example, and every time an update is performed in step S122 described later, the value of the switching gear ratio change is updated to the smaller value.

In step S114, if the gear ratio difference calculated in step S112 is less than the switching gear ratio change (NO in step S114), the paddle operation detector 300 determines whether the paddle operation by the driver is detected based on an operation of the paddle switches 150 by the driver (S116).

In step S116, if it is determined that the paddle operation is detected (YES in step S116), the process repeats from step S110. In step S116, if it is determined that the paddle operation is not detected (NO in step S116), the transmission mode switcher 302 determines whether the return operation has been performed based on an operation of the shift lever 160 by the driver (S118).

In step S118, if the return operation has not been performed (NO in step S118), the process repeats from step S112. In step S118, if the return operation has been performed (YES in step S118), the switching condition updater 310 updates the switching gear ratio change to the gear ratio difference calculated in step S112 (S120). In one example, the switching condition updater 310 updates the switching gear ratio change by using the gear ratio difference at the time the return operation is performed as the gear ratio change. Also, the table storage 312 stores, for each first gear ratio, the gear ratio change calculated in step S112. The switching condition updater 310 updates, for each first gear ratio, the gear ratio change calculated in step S112.

After the switching gear ratio change is updated in step S120, or if the gear ratio difference is equal to or greater than the switching gear ratio change in step S114 (YES in step S114), the transmission mode switcher 302 switches the transmission mode from the temporary manual mode to the automatic transmission mode (S122), and the transmission mode switching process ends.

As above, according to the vehicle 1 according to the embodiment, when the driver manually performs an operation to switch the transmission mode from the temporary manual mode to the automatic transmission mode, the difference between the first and second gear ratios, namely the gear ratio change, is calculated. With this arrangement, the vehicle 1 can determine, based on the gear ratio change, whether the driver-desired gear ratio has been reached. Furthermore, by updating the gear ratio change as the switching condition, the vehicle 1 can determine whether the driver-desired gear ratio has been reached when the gear ratio is changed by a similar degree in the future. With this arrangement, the vehicle 1 can switch to the automatic transmission mode as soon as the gear ratio change meets the driver-desired switching condition. Therefore, the driver burden related to switching the transmission mode can be alleviated.

Also, according to the vehicle 1 according to the present embodiment, by updating the gear ratio change as the switching condition for each first gear ratio, the gear ratio change can be updated to suit the characteristics of each gear ratio. Furthermore, since the gear ratio change is updated to suit the characteristics of the gear ratio, the vehicle 1 can appropriately determine the driver-desired gear ratio. Therefore, the driver burden related to switching the transmission mode can be alleviated more definitely.

4. Transmission Mode Control System According to Second Embodiment

Figure 4:
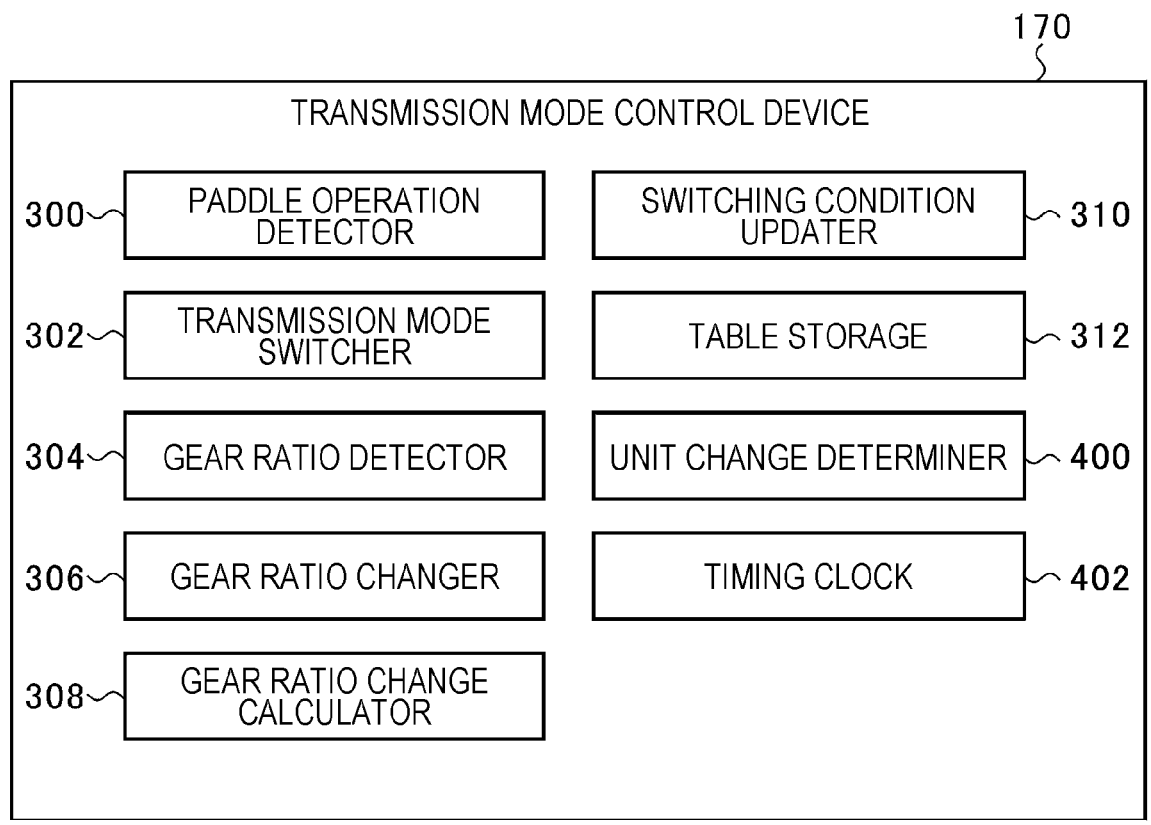
FIG. 4 is a block diagram illustrating an example of the functional configuration of a transmission mode control system according to an embodiment.

Next, FIG. 4 will be referenced to provide a detailed description of a vehicle 1 equipped with a transmission mode control system according to a second embodiment of the disclosure. Note that the second embodiment differs from the first embodiment in the matters described below, but otherwise is similar to the first embodiment in terms of configuration, function, and the like. Accordingly, a detailed description of the similar features is omitted.

FIG. 4 is a block diagram illustrating an example of the functional configuration of the transmission mode control system according to the second embodiment. As illustrated in FIG. 4, the transmission mode control device 170 according to the second embodiment includes the paddle operation detector 300, transmission mode switcher 302, gear ratio detector 304, gear ratio changer 306, gear ratio change calculator 308, switching condition updater 310, and table storage 312, which are components of the transmission mode control device 170 according to the first embodiment above. In addition, the transmission mode control device 170 according to the second embodiment further includes a unit change determiner 400 and a timing clock 402.

The unit change determiner 400 determines whether the unit change is less than or equal to a certain value. For example, the unit change determiner 400 determines whether the unit change calculated by the gear ratio change calculator 308 is less than or equal to a certain value.

The timing clock 402 measures the time since a certain timing. The certain timing is, for example, the timing at which the unit change determiner 400 determined that the unit change is less than or equal to the certain value. For example, the timing clock 402 measures the time from when the unit change becomes less than or equal to the certain value after an operation of the paddle switches 150 by the driver, to when the transmission mode is switched from the temporary manual mode to the automatic transmission mode in response to an operation of the shift lever 160 by the driver.

For example, the transmission mode switcher 302 determines whether the time measured by the timing clock 402 exceeds a switching time set as the switching condition for automatically switching from the temporary manual mode to the automatic transmission mode. If the time measured by the timing clock 402 exceeds the switching time, the transmission mode switcher 302 switches the transmission mode from the temporary manual mode to the automatic transmission mode.

The switching condition updater 310 updates the switching time for automatically switching from the temporary manual mode to the automatic transmission mode. The switching time is updated to a first measured time measured by the timing clock 402. For example, the first measured time is the time, measured by the timing clock 402, from when the unit change becomes less than or equal to the certain value after an operation of the paddle switches 150 by the driver, to when the transmission mode is switched from the temporary manual mode to the automatic transmission mode in response to an operation of the shift lever 160 by the driver.

Figure 5:
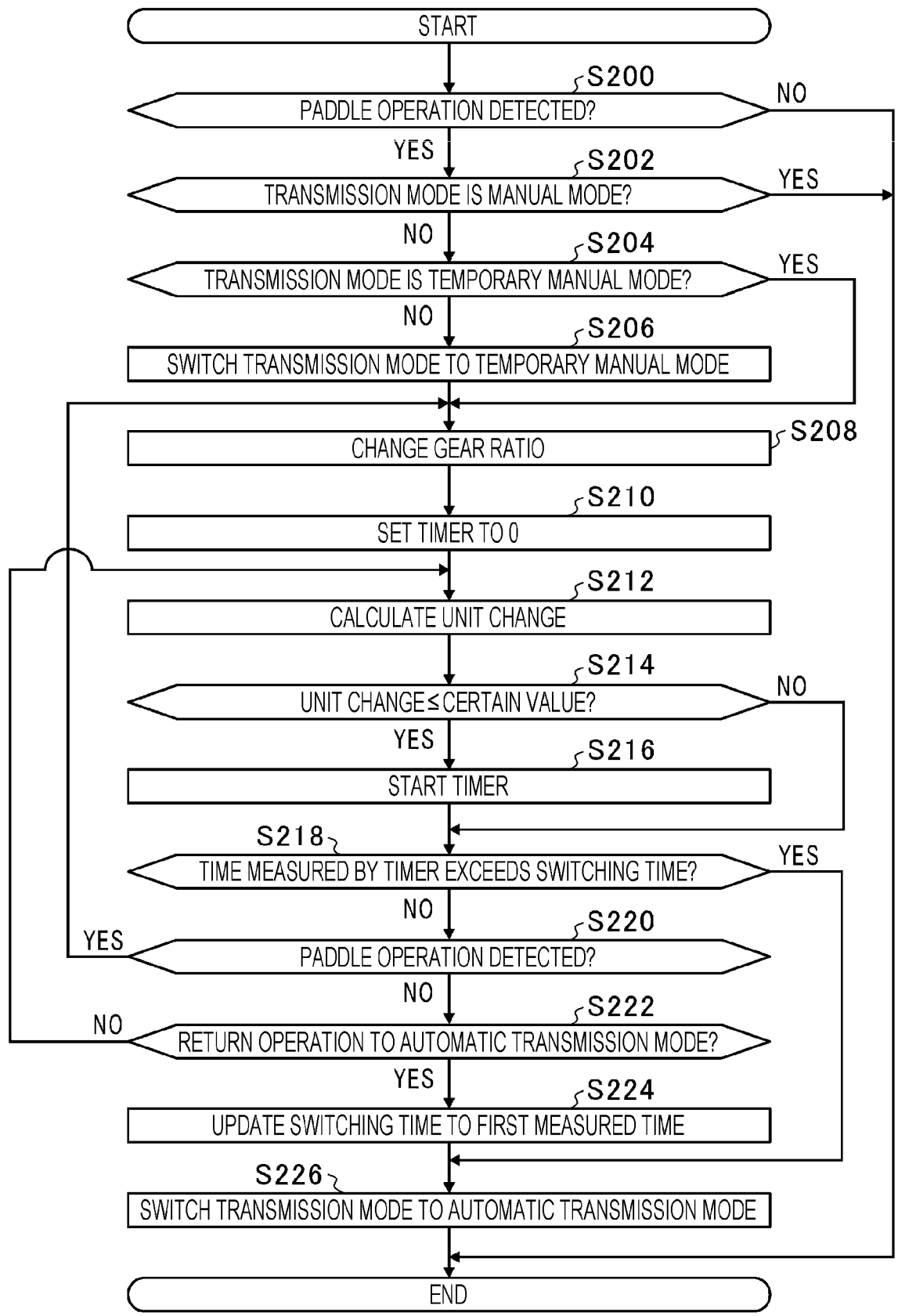
FIG. 5 is a flowchart illustrating a transmission mode switching process by a transmission mode control device according to the embodiment.

5. Process Flow of Transmission Mode Control System According to Second Embodiment Next, FIG. 5 will be referenced to describe a process flow by the transmission mode control device 170 of the transmission mode control system according to the second embodiment. FIG. 5 is a flowchart illustrating a transmission mode switching process by the transmission mode control device 170 according to the second embodiment.

As illustrated in FIG. 5, first, the paddle operation detector 300 detects whether the driver has performed the paddle operation based on an operation of the paddle switches 150 by the driver (S200). For example, if the driver performs the paddle operation, a signal is transmitted from the paddle switches 150 and the paddle operation detector 300 detects the signal. If the paddle operation detector 300 does not detect the paddle operation (NO in step S200), the transmission mode switching process ends.

If the paddle operation detector 300 detects the paddle operation (YES in step S200), the transmission mode switcher 302 determines whether the current transmission mode is the manual mode (S202). If the current transmission mode is the manual mode (YES in step S202), the transmission mode switching process ends. If the current transmission mode is not the manual mode (NO in step S202), the transmission mode switcher 302 determines whether the current transmission mode is the temporary manual mode (S204).

If the current transmission mode is not the temporary manual mode (NO in step S204), that is, if the current transmission mode is the automatic transmission mode, the transmission mode switcher 302 switches the transmission mode from the automatic transmission mode to the temporary manual mode (S206).

After the transmission mode is switched in step S206, or if the current transmission mode is the temporary manual mode in step S204 (YES in step S204), the gear ratio changer 306 issues a gear ratio changing instruction to the automatic transmission 140 based on the paddle operation by the driver (S208). If the driver operated the minus paddle switch 150a, the gear ratio changer 306 issues a gear ratio changing instruction to the automatic transmission 140 to downshift the gear ratio. If the driver operated the plus paddle switch 150b, the gear ratio changer 306 issues a gear ratio changing instruction to the automatic transmission 140 to upshift the gear ratio.

After the gear ratio is changed in step S208, the timing clock 402 sets a timer to 0 (S210). Thereafter, the gear ratio change calculator 308 calculates the unit change (S212). For example, after the gear ratio is changed, the gear ratio change calculator 308 obtains the difference between two gear ratios detected at a certain interval by the gear ratio detector 304. The gear ratio change calculator 308 divides this difference by the interval and obtains the result as the unit change.

After the unit change is calculated in step S212, the unit change determiner 400 determines whether the unit change calculated in step S212 is less than or equal to a certain value (S214). If the unit change is less than or equal to the certain value (YES in step S214), the timing clock 402 measures the time of the timer (S216).

After the time of the timer is measured in step S216, or if the unit change is not less than or equal to the certain value in step S214 (NO in step S214), the transmission mode switcher 302 determines whether the time measured by the timing clock 402 exceeds the switching time (S218). If the time measured by the timing clock 402 does not exceed the switching time (NO in step S218), the paddle operation detector 300 determines whether the paddle operation by the driver is detected based on an operation of the paddle switches 150 by the driver (S220).

In step S220, if it is determined that the paddle operation is detected (YES in step S220), the process repeats from step S208. In step S220, if it is determined that the paddle operation is not detected (NO in step S220), the transmission mode switcher 302 determines whether the return operation has been performed based on an operation of the shift lever 160 by the driver (S222).

In step S222, if the return operation has not been performed (NO in step S222), the process repeats from step S212. In step S222, if the return operation has been performed (YES in step S222), the switching condition updater 310 updates the switching time to the first measured time (S224). In one example, the switching condition updater 310 updates the switching time by setting the switching time to the first measured time at the timing when the return operation was performed. The switching condition updater 310 stores the updated switching time in the memory 174, for example.

After the switching time is updated in step S224, or if the time measured by the timing clock 402 exceeds the switching time in step S218 (YES in step S218), the transmission mode switcher 302 switches the transmission mode from the temporary manual mode to the automatic transmission mode (S226), and the transmission mode switching process ends.

As above, in the vehicle 1 of the second embodiment, after the gear ratio is changed, it is determined whether the unit change of the gear ratio is less than or equal to certain value. Additionally, the vehicle 1 updates the switching time by measuring the time since the timing at which the unit change of the gear ratio became less than or equal to the certain value, and setting the switching time to the first measured time up to when the driver manually performs an operation to switch the transmission mode. With this arrangement, in the future, the vehicle 1 can automatically switch the transmission mode after a certain time elapses from when the driver changes to a desired gear ratio. Therefore, the driver burden related to switching the transmission mode can be alleviated.

6. Overall Configuration of Vehicle and Transmission Mode Control System According to Third Embodiment Next, FIG. 6 will be referenced to provide a detailed description of a vehicle 1 equipped with a transmission mode control system according to a third embodiment of the disclosure. Note that the third embodiment is a modification of the second embodiment. As such, the following mainly describes the features that differ from the second embodiment. A detailed description is omitted in regard to the configuration, function, and the like that are similar to the second embodiment.

Figure 6:
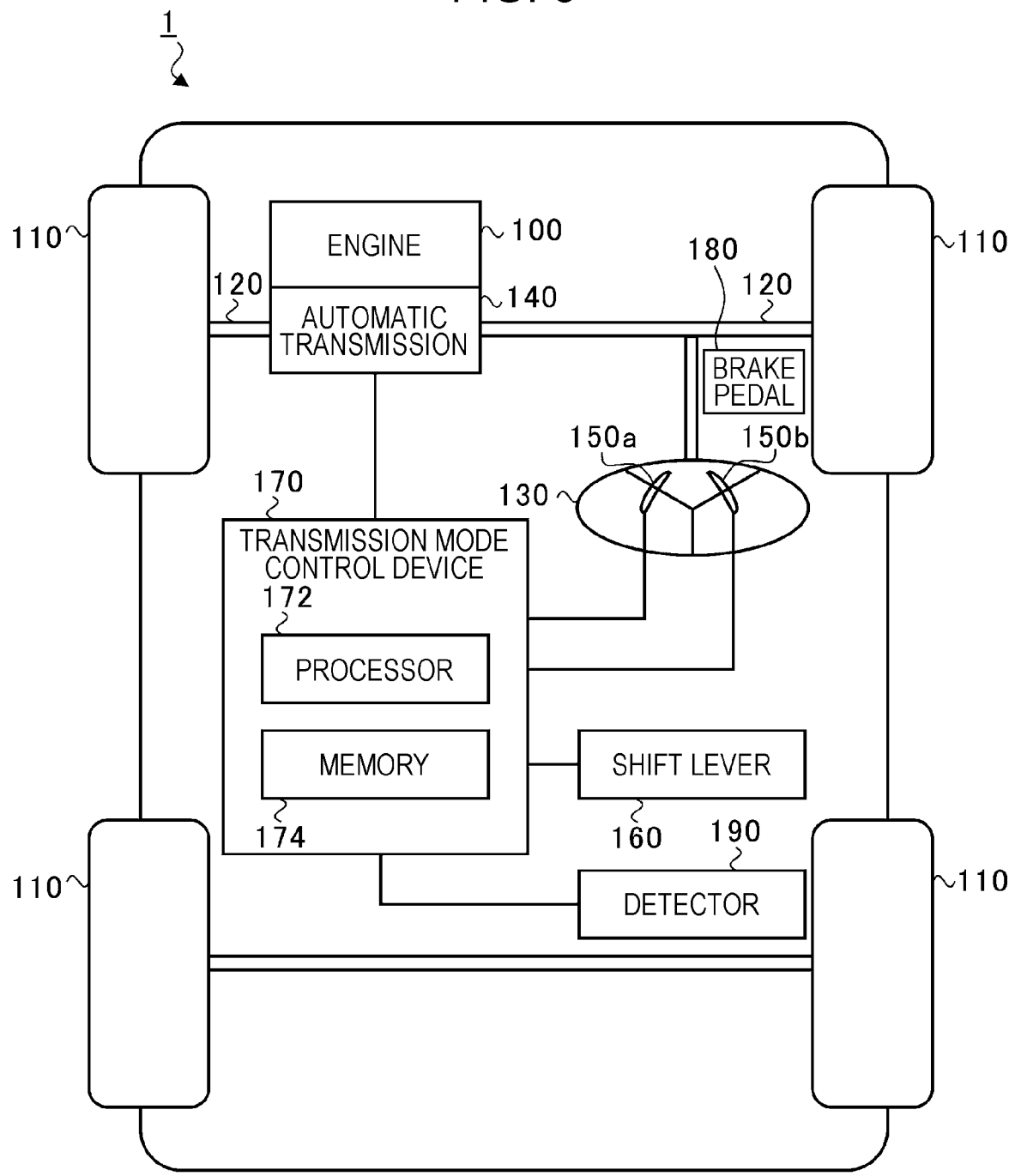
FIG. 6 is a schematic diagram illustrating a vehicle equipped with a transmission mode control system according to an embodiment.

FIG. 6 is a schematic diagram illustrating a vehicle equipped with a transmission mode control system according to the third embodiment. As illustrated in FIG. 6, the vehicle 1 according to the third embodiment includes the engine 100, drive wheels 110, drive shaft 120, steering wheel 130, automatic transmission 140, minus paddle switch 150a, plus paddle switch 150b, shift lever 160, and transmission mode control device 170, which are components of the vehicle 1 according to the second embodiment above. In addition, the vehicle 1 according to the third embodiment further includes a brake pedal 180 and a detector 190.

In one embodiment, the brake pedal 180 may serve as a "brake input device" configured to accept an operation by the driver for reducing the speed of the vehicle 1. The operation by the driver for reducing the speed of the vehicle 1 is, for example, an operation of depressing the brake pedal 180. The brake pedal 180 is coupled to brakes (not illustrated). For example, if the driver performs the operation of depressing the brake pedal 180, the brakes detect a brake control input that indicates how far the brake pedal 180 has been depressed. The brakes use hydraulic pressure to apply a braking force to the drive wheels 110 according to the detected brake control input.

The detector 190 is a road surface gradient detection sensor (gyro sensor), a road surface coefficient of friction sensor (hub unit sensor, road surface temperature sensor, outside temperature sensor, near-infrared sensor, laser light sensor), and the like. The detector 190 is coupled to the transmission mode control device 170 and transmits information detected by the detector 190 to the transmission mode control device 170.

The detector 190 detects information regarding road surface conditions. Road surface conditions include the gradient and the state of the road surface, for example. For example, the detector 190 detects information regarding the gradient of the road surface while the vehicle 1 is traveling. In one example, the detector 190 detects roll, pitch, and yaw angles, for example. Additionally, the detector 190 detects information regarding the state of the road surface, for example. The state of the road surface indicates whether the road surface is in a DRY, WET, SNOW, or ICE state, for example. As a specific example, the detector 190 detects an acting force that acts on the drive wheels 110 (front wheels and rear wheels) of the vehicle 1. The acting force has force components in three directions, including a fore-aft force, a lateral force, and a vertical force. Additionally, the detector 190 detects an image of the road surface ahead of the vehicle 1, the temperature of the road surface ahead of the vehicle 1, the outside temperature around the vehicle 1, the wetness of the road surface ahead of the vehicle 1, and the roughness of the road surface ahead of the vehicle 1, for example.

Figure 7:
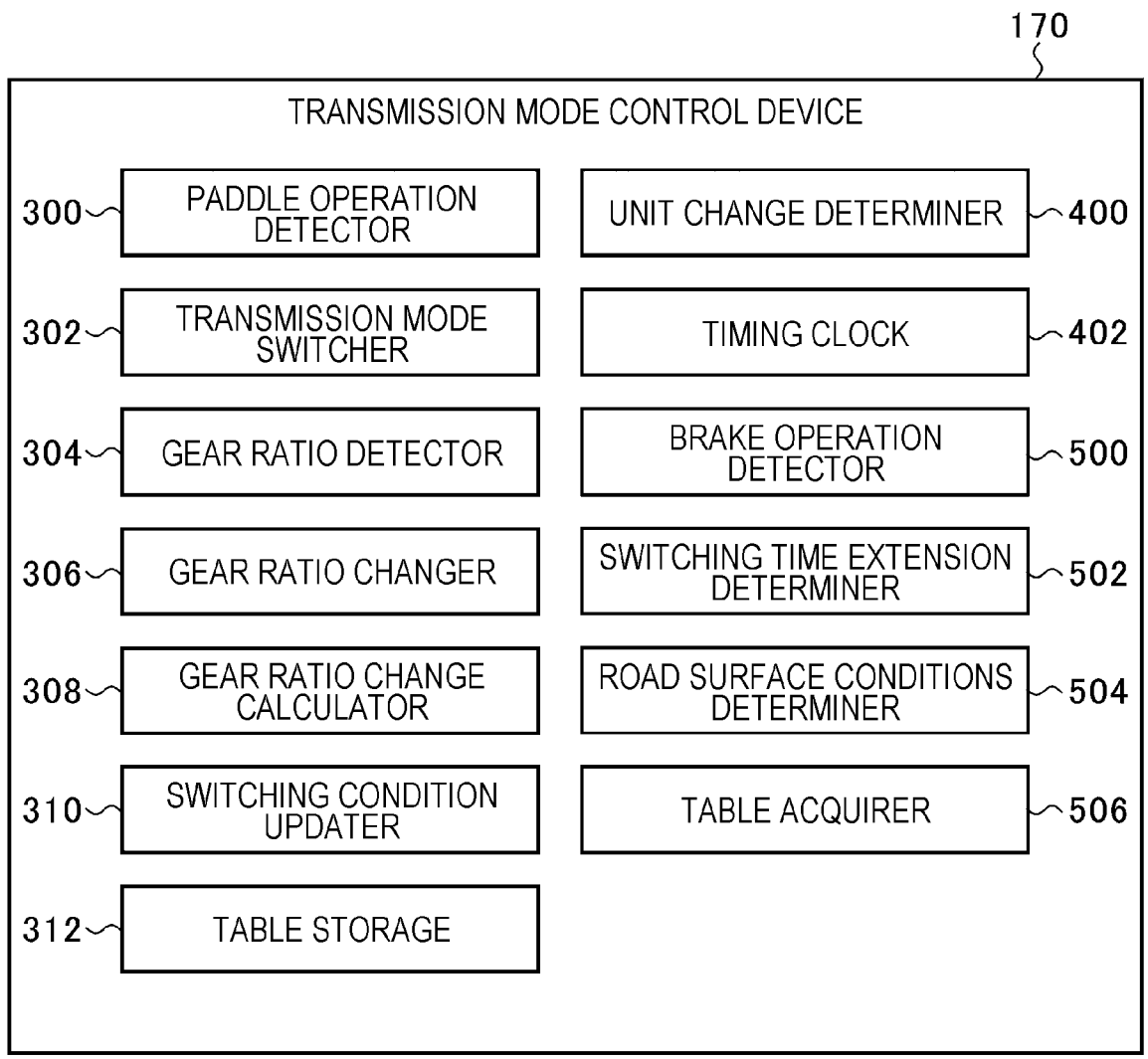
FIG. 7 is a block diagram illustrating an example of the functional configuration of the transmission mode control system according to the embodiment.

7. Functional Configuration of Transmission Mode Control System According to Third Embodiment Next, FIG. 7 will be referenced to describe a functional configuration of the transmission mode control system according to the third embodiment. FIG. 7 is a block diagram illustrating an example of the functional configuration of the transmission mode control system according to the third embodiment.

As illustrated in FIG. 7, the transmission mode control device 170 according to the third embodiment includes the paddle operation detector 300, transmission mode switcher 302, gear ratio detector 304, gear ratio changer 306, gear ratio change calculator 308, switching condition updater 310, table storage 312, unit change determiner 400, and timing clock 402, which are components of the transmission mode control device 170 according to the second embodiment above. In addition, the transmission mode control device 170 according to the third embodiment further includes a brake operation detector 500, a switching time extension determiner 502, a road surface conditions determiner 504, and a table acquirer 506.

The gear ratio change calculator 308 calculates information related to a change of gear ratio, and stores the calculated information in the memory 174, for example. The information related to a change of gear ratio may be, for example, the difference in the most recent temporary manual mode between the gear ratio when a gear shift is executed according to the most recent paddle operation by the driver and the gear ratio after being changed according to an instruction from the gear ratio changer 306.

The switching condition updater 310 updates the switching time to a second measured time, for example. The second measured time is, for example, the time measured by the timing clock 402 after a paddle operation of the paddle switches 150 by the driver to when the transmission mode is switched from the temporary manual mode to the automatic transmission mode in response to the return operation of the shift lever 160 by the driver.

Also, if the switching time extension determiner 502 to be described later has determined to extend the switching time, the switching condition updater 310 updates the switching time to be the switching time plus a specified time. That is, the switching condition updater 310 extends the switching time by the specified time according to the result of a determination by the switching time extension determiner 502. The specified time is a time provided for extending the switching time and is a preset time, for example. However, the specified time is not limited to the above and may also be a calculated time. For example, assume that the gear ratio is changed to a lower speed by an operation of the minus paddle switch 150a by the driver, and after the switching time elapses, the brake pedal 180 is operated by the driver. In this case, the specified time may be calculated as the time during which the brake pedal 180 is being operated.

Also, although described in detail later, the switching time may be differentiated from a predetermined time depending on certain driving conditions determined by the switching time extension determiner 502 and road surface conditions determined by the road surface conditions determiner 504 to be described later.

The table storage 312 uses a switching condition table to store various control information in the memory 174. The switching condition table is, for example, a table in which road surface conditions determined by the road surface conditions determiner 504 to be described later are associated with one or more of the switching time, a post-switching determination time to be described later, the specified time, and a time allowed for extension to be described later. That is, in the table storage 312, a switching time, a post-switching determination time, a specified time, or a time allowed for extension is stored for each type of road surface conditions based on the information related to the road surface conditions detected by the detector 190.

The timing clock 402 measures the time since a certain timing. The certain timing is, for example, the timing at which the gear ratio was changed according to an instruction from the gear ratio changer 306. The certain timing may also be, for example, the timing at which the transmission mode was switched from the temporary manual mode to the automatic transmission mode. The timing clock 402 has a first timer and a second timer. The first timer of the timing clock 402 measures the time since the timing after an operation of the paddle switches 150 by the driver, for example. However, the first timer of the timing clock 402 is not limited to the above. For example, the first timer may also measure the time since the timing at which the gear ratio was changed according to an instruction from the gear ratio changer 306 after an operation of the paddle switches 150 by the driver. The second timer of the timing clock 402 measures the time since the timing at which the transmission mode was switched from the temporary manual mode to the automatic transmission mode in response to the return operation of the shift lever 160 by the driver, for example. However, the second timer of the timing clock 402 is not limited to the above. For example, the second timer may also measure the time since the timing of the return operation of the shift lever 160 by the driver. As another example, the second timer of the timing clock 402 may measure the time since the timing at which the transmission mode was automatically switched from the temporary manual mode to the automatic transmission mode after the switching time elapses.

The brake operation detector 500 detects an operation of depressing the brake pedal 180 by the driver. For example, if the driver depress the brake pedal 180, the brake operation detector 500 receives a signal transmitted from the brakes and detects that the brake pedal 180 has been depressed.

The switching time extension determiner 502 determines whether to extend the switching time according to certain driving conditions. The certain driving conditions are, for example, when the driver performs a certain paddle operation within the post-switching determination time after the switching time elapses. The certain paddle operation in this case causes the gear ratio to change in the same direction as the change of gear ratio when a gear shift is executed in response to the paddle operation by the driver before the switching time elapses. The post-switching determination time is, for example, a preset time that serves as a reference that the switching time extension determiner 502 uses to determine whether to extend the switching time after the transmission mode is automatically switched from the temporary manual mode to the automatic transmission mode. However, the post-switching determination time is not limited to the above. For example, the post-switching determination time may also be a calculated time, or a time that varies depending on the road surface conditions.

In other words, the switching time extension determiner 502 determines to extend the switching time if the driver performs a certain paddle operation within the post-switching determination time after the switching time elapses. The certain paddle operation in this case causes the gear ratio to change in the same direction as the change of gear ratio stored by the gear ratio change calculator 308 in the most recent temporary manual mode.

For example, the gear ratio changer 306 shifts gears to a lower speed if the driver performs a paddle operation on the minus paddle switch 150a in the most recent temporary manual mode. Subsequently, the switching time extension determiner 502 determines to extend the switching time if the driver performs a paddle operation on the minus paddle switch 150a again within the post-switching determination time after the switching time elapses. Note that the same applies to the case of shifting gears to a higher speed.

In other words, the switching time extension determiner 502 determines to extend the switching time if the driver performs a certain paddle operation within the post-switching determination time after the transmission mode is automatically switched to the automatic transmission mode. The certain paddle operation in this case is a paddle operation in the same direction as the paddle operation that the driver performed in the most recent temporary manual mode.

The certain driving conditions are also, for example, when the driver shifts gears to a lower speed in the most recent temporary manual mode, and then depresses the brake pedal 180 within the post-switching determination time after the switching time elapses. In other words, in the temporary manual mode, the gear ratio changer 306 shifts gears to a lower speed in response to a paddle operation on the minus paddle switch 150a by the driver. Then, when the switching time elapses after the gear shift, the transmission mode switcher 302 switches the transmission mode from the temporary manual mode to the automatic transmission mode. Furthermore, if the driver operates the brake pedal 180 within the post-switching determination time after the switching time elapses, the switching time extension determiner 502 determines to extend the switching time. Note that the post-switching determination time may be the same time or different times for each type of certain driving conditions.

The certain driving conditions are also, for example, when the time measured by the second timer of the timing clock 402 exceeds the time allowed for extension. The time allowed for extension serves as a reference that the switching time extension determiner 502 uses to determine whether to extend the switching time after the transmission mode is switched from the temporary manual mode to the automatic transmission mode. The time allowed for extension is longer than the post-switching determination time. The time allowed for extension is a preset time, for example, but is not limited thereto. The time allowed for extension may also be a calculated time, or a time that varies depending on the road surface conditions. In other words, the switching time extension determiner 502 determines to extend the switching time if the time allowed for extension elapses after the transmission mode is switched from the temporary manual mode to the automatic transmission mode.

Moreover, the switching time extension determiner 502, after making a determination based on the time allowed for extension once, periodically determines whether the time allowed for extension has elapsed. That is, the switching time extension determiner 502 determines to extend the switching time every time the time allowed for extension elapses. In this case, the switching time extension determiner 502 determines whether the switching time is equal to or greater than an upper time limit, and determines to extend the switching time if the switching time is less than the upper time limit. The upper time limit is, for example, an initial set time that the switching was set to initially. In this way, imposing an upper time limit on the extension of the switching time can prevent the switching time from becoming longer than the initial set time, and the transmission mode can be switched automatically in a reliable way by the timing at which the initial set time of the switching time elapses.

If the switching time extension determiner 502 determines to extend the switching time according to the certain driving conditions, the switching condition updater 310 extends the switching time by the specified time. Note that the specified time may be the same time or different times for each type of certain driving conditions.

The road surface conditions determiner 504 determines, based on information from the detector 190, the conditions of the road surface that the vehicle 1 is driving on. For example, the road surface conditions determiner 504 determines, based on information from the detector 190, whether the road surface that the vehicle 1 is driving on has an uphill gradient, is flat, or has a downhill gradient. For example, the road surface conditions determiner 504 uses the detector 190, namely a gyro sensor, to detect the attitude of the vehicle 1. In one example, information indicating the roll, pitch, and yaw angles of the vehicle 1 is detected. Based on this information, the road surface conditions determiner 504 determines whether the road surface that the vehicle 1 is driving on has an uphill gradient, is flat, or has a downhill gradient. Note that the road surface conditions determiner 504 is not limited to merely determining whether the road surface that the vehicle 1 is driving on has an uphill gradient, is flat, or has a downhill gradient. The road surface conditions determiner 504 may also directly use the gradient angle of the road surface that the vehicle 1 is driving on.

As another example, the road surface conditions determiner 504 estimates, based on information from the detector 190, the road surface coefficient of friction p of the road surface that the vehicle 1 is driving on or the road surface ahead of the vehicle 1. Based on the road surface coefficient of friction p, the road surface conditions determiner 504 determines the state of the road surface.

For example, the road surface conditions determiner 504 estimates the road surface coefficient of friction p based on the acting force that acts on the drive wheels 110 (front wheels and rear wheels) of the vehicle 1. The acting force is detected by the detector 190. As another example, the road surface conditions determiner 504 estimates the road surface coefficient of friction p of the road surface ahead of the vehicle 1 based on information detected by the detector 190. In one example, the information is one or more of an image of the road surface ahead of the vehicle 1, the temperature of the road surface ahead of the vehicle 1, the outside temperature around the vehicle 1, the wetness of the road surface ahead of the vehicle 1, and the roughness of the road surface ahead of the vehicle 1. The road surface conditions determiner 504 then determines, based on the estimated road surface coefficient of friction p, whether the road surface is in a DRY, WET, SNOW, or ICE state.

The table acquirer 506 references the switching condition table stored in the memory 174 and sets various control information. For example, the table acquirer 506 references the switching condition table stored in the memory 174 and sets the switching time, the post-switching determination time, the specified time, or the time allowed for extension according to the road surface conditions determined by the road surface conditions determiner 504. That is, the table acquirer 506 references the switching condition table stored in association with one or more of the gradient of the road surface, one or multiple states of the road surface, the switching time, the post-switching determination time, the specified time, and the time allowed for extension. The table acquirer 506 then sets various control information according to the road surface conditions.

As an example, assume that the road surface that the vehicle 1 is driving on has a downhill gradient, and the road surface conditions determiner 504 determines that the road surface that the vehicle 1 is driving on has a downhill gradient. In this case, the table acquirer 506 references the switching condition table and determines the switching time for a downhill gradient. Thereafter, the transmission mode will be controlled using the switching time for a downhill gradient as long as the road surface conditions determiner 504 continues to determine that the road surface that the vehicle 1 is driving on has a downhill gradient. For example, the transmission mode switcher 302 automatically switches the transmission mode from the temporary manual mode to the automatic transmission mode when the switching time for a downhill gradient elapses. The switching condition updater 310 extends the switching time for a downhill gradient by the specified time according to the result of a determination by the switching time extension determiner 502. In addition, the table storage 312 stores in the memory 174 the switching time for a downhill gradient that has been extended by the specified time. Note that the post-switching determination time, the specified time, and the time allowed for extension are also set similarly to the switching time.

Note that in the case in which various control information is to be associated with the gradient of the road surface, the table storage 312 stores the various information categorized into uphill gradient, flat, and downhill gradient, for example. In the case in which various control information is to be associated with gradient angles of the gradient of the road surface, the table storage 312 stores the various information categorized at fixed intervals of the gradient angle of the road surface, for example. In the case in which various control information is to be associated with the state of the road surface, the table storage 312 stores the various information categorized into DRY, WET, SNOW, and ICE, for example.

For example, the table storage 312 may store in the memory 174 a switching condition table in which a combination of multiple types of road surface conditions is associated with various control information. The table acquirer 506 may reference this switching condition table. For example, the table storage 312 may store in the memory 174 a switching condition table in which a combination of the gradient and the state of the road surface is associated with various control information. The table acquirer 506 may reference this switching condition table. For example, the table storage 312 stores in the switching condition table the switching time corresponding to a road surface having a downhill gradient and in the DRY state. Thereafter, if the road surface conditions determiner 504 determines that the road surface has a downhill gradient and is in the DRY state, the table acquirer 506 acquires the switching time corresponding to a road surface having a downhill gradient and in the DRY state. Note that in regard to the switching condition table, the various control information may be stored collectively in a single table or separately in multiple tables.

Figure 8:
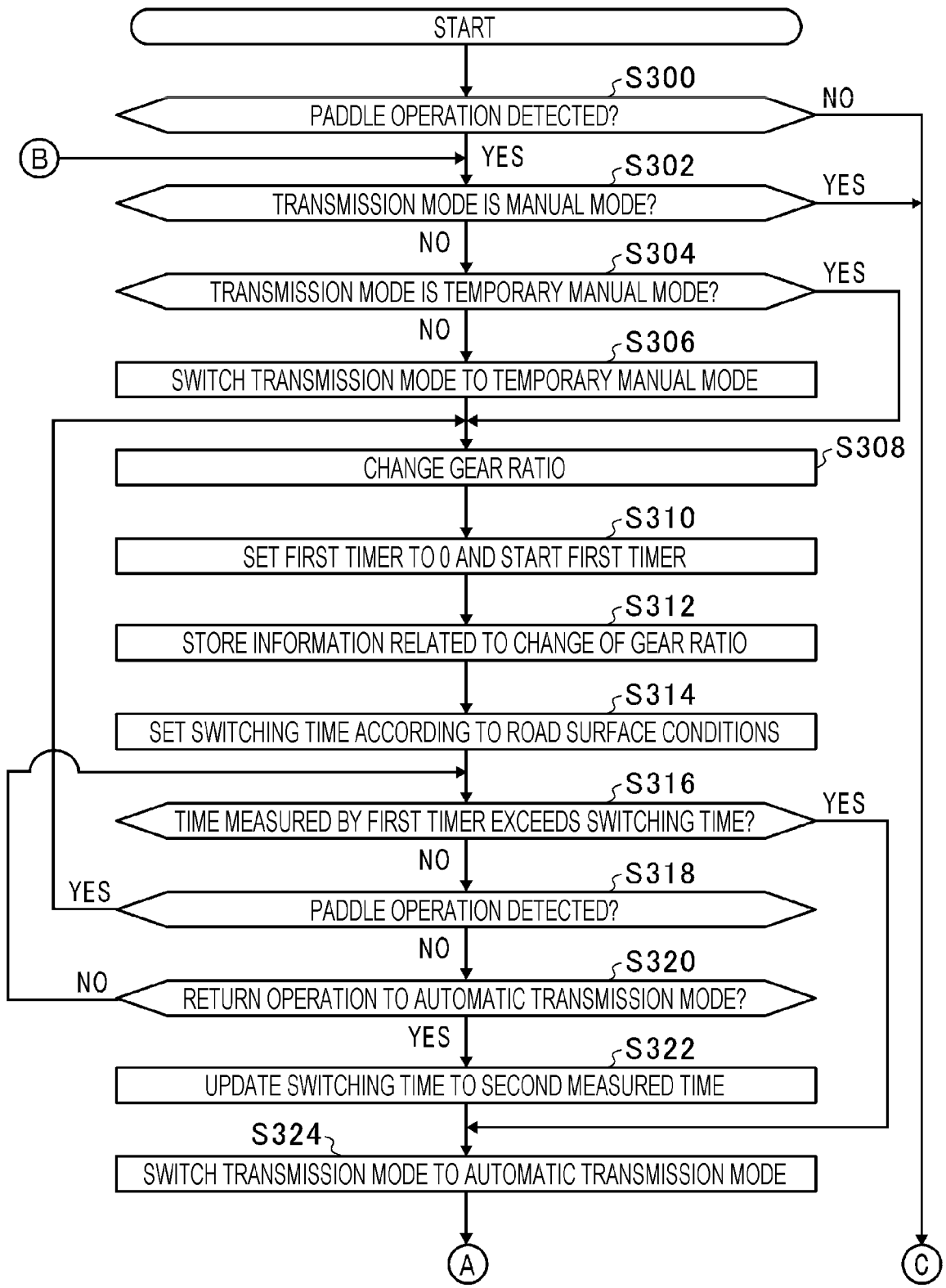
FIG. 8 is a first flowchart illustrating a transmission mode switching process by a transmission mode control device according to the embodiment.
Figure 9:
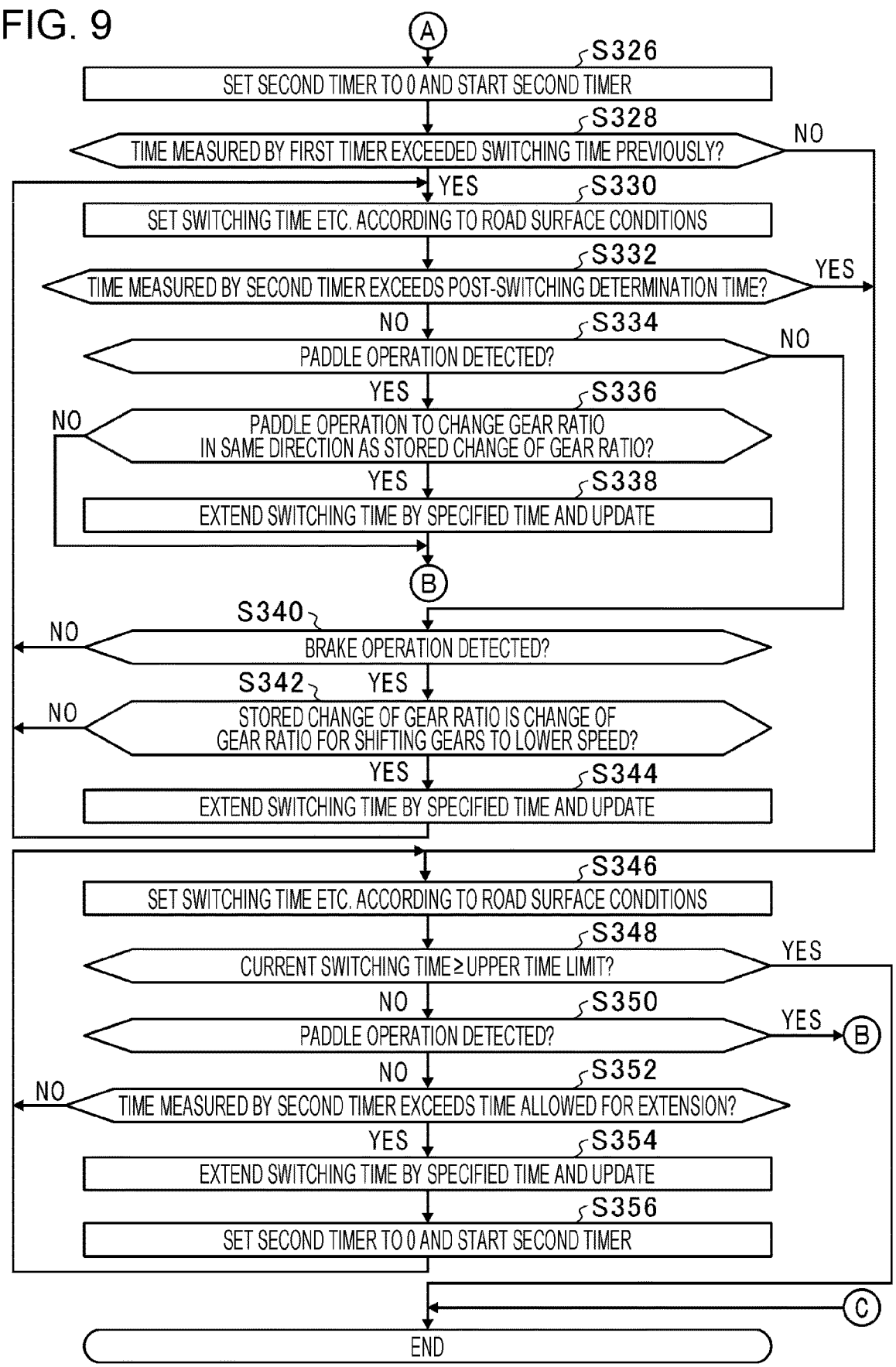
FIG. 9 is a second flowchart illustrating a transmission mode switching process by the transmission mode control device according to the embodiment.

8. Process Flow of Transmission Mode Control System According to Third Embodiment Next, FIGS. 8 and 9 will be referenced to describe a process flow by the transmission mode control device 170 of the transmission mode control system according to the third embodiment. FIG. 8 is a first flowchart illustrating a transmission mode switching process by the transmission mode control device 170 according to the third embodiment, and FIG. 9 is a second flowchart illustrating the transmission mode switching process by a transmission mode control device according to the third embodiment. Note that the process from step S300 to step S308 illustrated in FIG. 8 is the same as the process from step S200 to step S208 in the transmission mode switching process by the transmission mode control device 170 according to the second embodiment illustrated in FIG. 5. Therefore, a description is omitted.

As illustrated in FIG. 8, after the gear ratio is changed in step S308, the timing clock 402 sets the first timer to 0 and starts measuring time with the first timer (S310). Thereafter, the gear ratio change calculator 308 calculates information related to a change of gear ratio, and stores the calculated information in the memory 174 (S312).

Thereafter, the table acquirer 506 references the switching condition table stored in the memory 174 and sets the switching time according to the road surface conditions determined by the road surface conditions determiner 504 (S314).

Thereafter, the transmission mode switcher 302 determines whether the time measured by the first timer of the timing clock 402 exceeds the switching time (S316). If it is determined that the time measured by the first timer of the timing clock 402 exceeds the switching time (YES in step S316), the process proceeds to step S324. That is, when the switching time elapses after an operation of the paddle switches 150 by the driver, the transmission mode switcher 302 automatically switches the transmission mode from the temporary manual mode to the automatic transmission mode.

If it is determined that the time measured by the first timer of the timing clock 402 does not exceed the switching time (NO in step S316), the paddle operation detector 300 determines whether the paddle operation by the driver is detected based on an operation of the paddle switches 150 by the driver (S318).

In step S318, if it is determined that the paddle operation is detected (YES in step S318), the process repeats from step S308. In step S318, if it is determined that the paddle operation is not detected (NO in step S318), the transmission mode switcher 302 determines whether the return operation has been performed based on an operation of the shift lever 160 by the driver (S320).

In step S320, if it is determined that the return operation has not been performed (NO in step S320), the process repeats from step S316. In step S320, if it is determined that the return operation has been performed (YES in step S320), the switching condition updater 310 updates the switching time to the second measured time (S322).

After the switching time is updated in step S322, or if the time measured by the first timer of the timing clock 402 is determined to exceed the switching time in step S316 (YES in step S316), the transmission mode switcher 302 switches the transmission mode from the temporary manual mode to the automatic transmission mode (S324).

Next, as illustrated in FIG. 9, after the transmission mode is switched from the temporary manual mode to the automatic transmission mode in step S324, the timing clock 402 sets the second timer to 0 and starts measuring time with the second timer (S326).

Thereafter, the switching time extension determiner 502 determines whether the transmission mode was automatically switched from the temporary manual mode to the automatic transmission mode in the previous switch from the temporary manual mode to the automatic transmission mode (S328). That is, the switching time extension determiner 502 determines whether the time measured by the first timer of the timing clock 402 exceeded in the switching time in the previous temporary manual mode.

In step S328, if it is determined that the transmission mode was automatically switched from the temporary manual mode to the automatic transmission mode (YES in step S328), the table acquirer 506 references the switching condition table stored in the memory 174 and sets the switching time, the post-switching determination time, and the specified time according to the road surface conditions determined by the road surface conditions determiner 504 (S330).

Thereafter, the switching time extension determiner 502 determines whether the time measured by the second timer of the timing clock 402 that was started in step S326 exceeds the post-switching determination time (S332). If it is determined that the time measured by the second timer of the timing clock 402 does not exceed the post-switching determination time (NO in step S332), the paddle operation detector 300 determines whether the paddle operation by the driver is detected based on an operation of the paddle switches 150 by the driver (S334).

In step S334, if it is determined that the paddle operation is detected (YES in step S334), the switching time extension determiner 502 determines whether the driver performed the paddle operation to change the gear ratio in the same direction as the change of gear ratio stored in step S312 (S336). For example, in step S312, the gear ratio change calculator 308 subtracts the gear ratio after being changed according to an instruction from the gear ratio changer 306 from the gear ratio when a gear shift is executed according to the paddle operation by the driver. Then, in step S336, the switching time extension determiner 502 determines that the gears were shifted to a lower speed if the above difference is greater than 0. Conversely, the switching time extension determiner 502 determines that the gears were shifted to a higher speed if the above difference is less than 0. Thereafter, if the change of gear ratio stored in step S312 is a gear shift to a lower speed and the driver performed the paddle operation on the minus paddle switch 150*a*, the switching time extension determiner 502 determines that the driver performed the paddle operation to change the gear ratio in the same direction. Alternatively, if the change of gear ratio stored in step S312 is a gear shift to a higher speed and the driver performed the paddle operation on the plus paddle switch 150*b*, it is determined that the driver performed the paddle operation to change the gear ratio in the same direction. In other words, it is determined whether the driver performed the paddle operation to change the gear ratio in the same direction.

If, as a result of the determination by the switching time extension determiner 502 in step S336, it is determined that the driver did not perform a paddle operation to change the gear ratio in the same direction (NO in step S336), the process repeats from step S302. If, as a result of the determination by the switching time extension determiner 502 in step S336, it is determined that the driver performed a paddle operation to change the gear ratio in the same direction (YES in step S336), the switching condition updater 310 updates the switching time to the switching time plus the specified time (S338). For example, the switching condition updater 310 stores the switching time plus the specified time in the memory 174. After that, the process repeats from step S302.

In step S334, if it is determined that the paddle operation is not detected (NO in step S334), the brake operation detector 500 determines whether an operation of depressing the brake pedal 180 by the driver is detected (S340). In step S340, if it is determined that the operation of depressing the brake pedal 180 is not detected (NO in step S340), the process repeats from step S330.

In step S340, if it is determined that the operation of depressing the brake pedal 180 is detected (YES in step S340), the switching time extension determiner 502 determines, based on the information related to the change of gear ratio stored in step S312, whether the change of gear ratio is a gear shift to a lower speed (S342). If, as a result of the determination in step S342, it is determined based on the information related to the change of gear ratio stored in step S312 that the change of gear ratio is not a gear shift to a lower speed (NO in step S342), the process repeats from step S330.

If, as a result of the determination in step S342, it is determined based on the information related to the change of gear ratio stored in step S312 that the change of gear ratio is a gear shift to a lower speed (YES in step S342), the switching condition updater 310 updates the switching time to the switching plus the specified time (S344). For example, the switching condition updater 310 stores the switching time plus the specified time in the memory 174. After that, the process repeats from step S330.

Also, if it is determined in step S328 that the transmission mode was not automatically switched from the temporary manual mode to the automatic transmission mode (NO in step S328), or if it is determined in step S332 that the time measured by the second timer of the timing clock 402 exceeds the post-switching determination time (YES in step S332), the table acquirer 506 references the switching condition table stored in the memory 174 and sets the switching time, the time allowed for extension, and the specified time according to the road surface conditions determined by the road surface conditions determiner 504 (S346). Thereafter, the switching time extension determiner 502 determines whether the switching time is equal to or greater than the upper time limit (S348).

If it is determined that the switching time is equal to or greater than the upper time limit (YES in step S348), the transmission mode switching process ends. If it is determined that switching time is not equal to or greater than the upper time limit (NO in step S348), the paddle operation detector 300 determines whether the paddle operation by the driver is detected based on an operation of the paddle switches 150 by the driver (S350). In step S350, if it is determined that the paddle operation is detected (YES in step S350), the process repeats from step S302.

In step S350, if it is determined that the paddle operation is not detected (NO in step S350), the switching time extension determiner 502 determines whether the time measured by the second timer of the timing clock 402 exceeds the time allowed for extension (S352). If it is determined that the time measured by the second timer of the timing clock 402 does not exceed the time allowed for extension (NO in step S352), the process repeats from step S346. If it is determined that the time measured by the second timer of the timing clock 402 exceeds the time allowed for extension (YES in step S352), the switching condition updater 310 updates the switching time to the switching time plus the specified time (S354). For example, the switching condition updater 310 stores the switching time plus the specified time in the memory 174. After that, the timing clock 402 sets the second timer to 0 again and starts measuring time with the second timer (S356), and the process repeats from step S346.

As above, according to the vehicle 1 according to the third embodiment, the switching time is extended by the specified time when the driver performs a certain paddle operation within the post-switching determination time after the transmission mode is switched to the automatic transmission mode. The certain paddle operation in this case causes the gear ratio to change in the same direction as the previous change of gear ratio. With this arrangement, the switching time can be extended appropriately at a timing at which the driver desires to extend the switching time. Furthermore, extending the switching time appropriately makes it possible to achieve a switch from the temporary manual mode to the automatic transmission mode that feels optimal to the driver.

Moreover, according to the vehicle 1 according to the third embodiment, the operation of the brake pedal 180 by the driver enables the driver to grasp that the transmission mode has been automatically switched to the automatic transmission mode before the target gear ratio or vehicle speed is reached. This arrangement can extend the switching time appropriately without having the driver perform a paddle operation, thereby alleviating the driver burden of performing the paddle operation. Furthermore, extending the switching time appropriately makes it possible to achieve a switch from the temporary manual mode to the automatic transmission mode that feels optimal to the driver.

Moreover, according to the vehicle 1 according to the third embodiment, the switching time is extended by the specified time every time the time allowed for extension elapses. With this arrangement, even when the switching time has become short and the use of the temporary manual mode feels burdensome to the driver, it is possible to revert back to a switching time that feels optimal to the driver.

According to the vehicle 1 according to the third embodiment, the switching time as well as the post-switching determination time, time allowed for extension, and specified time are stored for different types of road surface conditions. Moreover, a process is executed to set the switching time as well as the post-switching determination time, time allowed for extension, and specified time according to the road surface conditions. This arrangement makes it possible to set various control information according to the road surface conditions and execute optimal switching from the manual transmission mode to the automatic transmission mode according to the road surface conditions.

9. Transmission Mode Control System According to Fourth Embodiment

Figure 10:
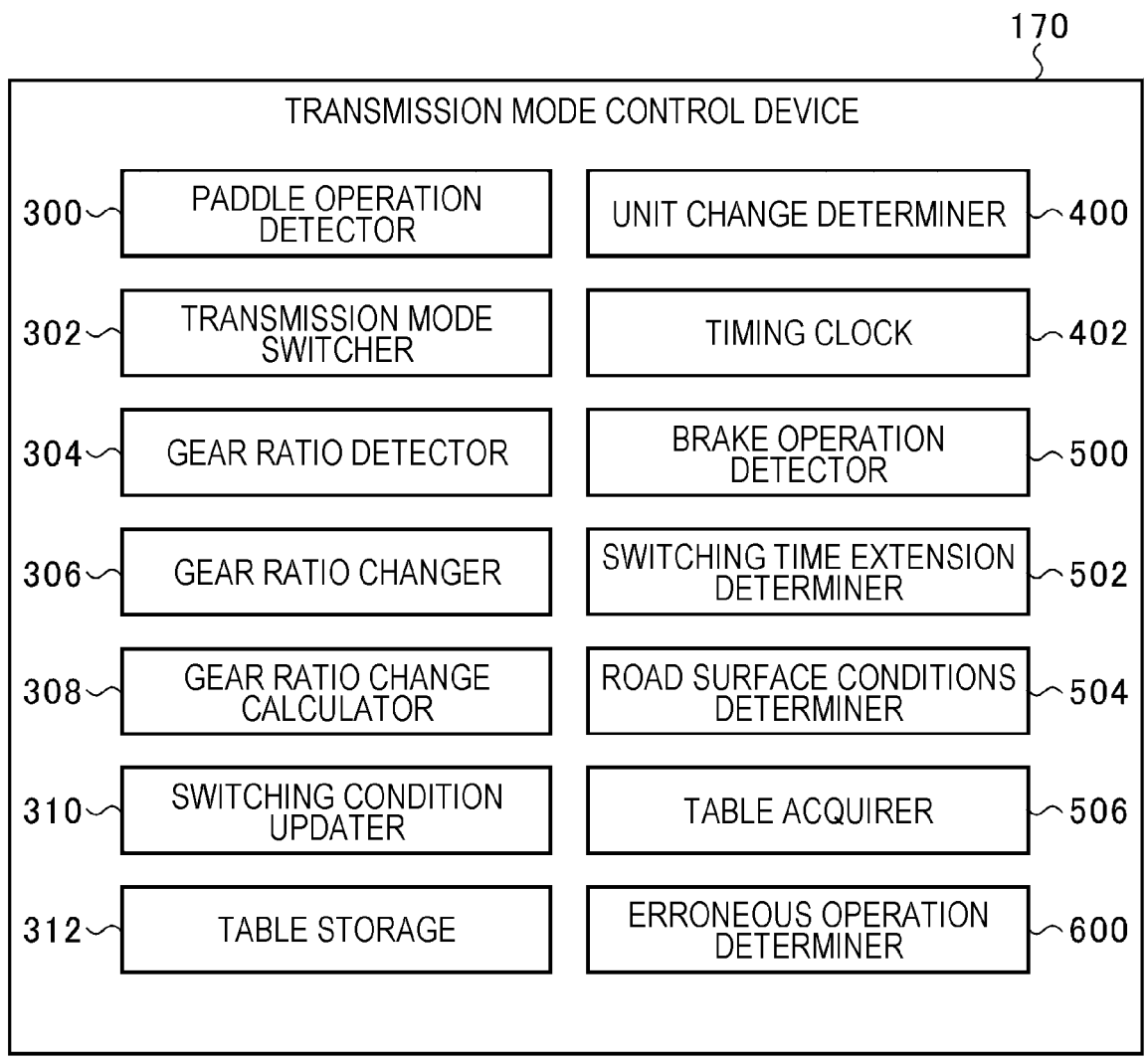
FIG. 10 is a block diagram illustrating an example of the functional configuration of a transmission mode control system according to an embodiment.

Next, FIG. 10 will be referenced to provide a detailed description of a vehicle 1 equipped with a transmission mode control system according to a fourth embodiment of the disclosure. Note that the fourth embodiment is a modification of the third embodiment. As such, the following mainly describes the features that differ from the third embodiment. A detailed description is omitted in regard to the configuration, function, and the like that are similar to the third embodiment.

In the transmission mode control system according to the third embodiment, if the transmission mode is the temporary manual mode and the driver performs the return operation with the shift lever 160 within the switching time, the switching time is updated to the second measured time. That is, if the driver performs the return operation, the switching time is updated to an earlier time than the current switching time. However, if the driver performs the return operation at an early timing by mistake, for example, the switching time will be updated to an early time. Moreover, the switching time that has been updated to the early time cannot be reverted to the original switching time unless the driver performs a certain operation or unless a certain time elapses. Thus, maneuverability in the temporary manual mode may be lowered. Accordingly, in the transmission mode control system according to the fourth embodiment, if an early return operation is performed by the driver, it is determined whether to update the switching time, and the switching time is updated if necessary.

FIG. 10 is a block diagram illustrating an example of the functional configuration of the transmission mode control system according to the fourth embodiment. As illustrated in FIG. 10, the transmission mode control device 170 according to the fourth embodiment includes the paddle operation detector 300, transmission mode switcher 302, gear ratio detector 304, gear ratio changer 306, gear ratio change calculator 308, switching condition updater 310, table storage 312, unit change determiner 400, timing clock 402, brake operation detector 500, switching time extension determiner 502, road surface conditions determiner 504, and table acquirer 506, which are components of the transmission mode control device 170 according to the third embodiment above. In addition, the transmission mode control device 170 according to the fourth embodiment further includes an erroneous operation determiner 600.

The erroneous operation determiner 600 determines whether to update the switching time if a specific cancel operation is performed on the shift lever 160 by the driver in the temporary manual mode. The specific cancel operation is the return operation of the shift lever 160 by the driver, performed within an erroneous operation determination time after the paddle operation of the paddle switches 150 by the driver. The erroneous operation determination time serves as a reference that the erroneous operation determiner 600 uses to determine whether to update the switching time if the return operation is performed by the driver in the temporary manual mode. The erroneous operation determination time is shorter than the switching time. The erroneous operation determination time is a preset time, for example. However, the erroneous operation determination time is not limited to the above. For example, the erroneous operation determination time may also be a calculated time, or a time that varies depending on the road surface conditions.

The erroneous operation determiner 600 determines to update the switching time if the specific cancel operation is performed multiple times, for example. That is, if the specific cancel operation is performed multiple times, the driver is thought to be performing the specific cancel operation intentionally and not as an erroneous operation. Therefore, the switching time is updated to a specified cancel time that is shorter than the switching time. The specified cancel time is the second measured time, for example. The specified cancel time is not limited to the above and may also be a predetermined time that is shorter than the switching time, for example. Note that in the case in which the specified cancel time is a predetermined time, the switching condition updater 310 may set a lower time limit. This arrangement imposes a limit so that when the switching time is updated, the switching time is not updated to a time that is shorter than the lower time limit.

For example, if the specific cancel operation is performed for the first time in a first instance of the temporary manual mode, the transmission mode switcher 302 switches the transmission mode from the temporary manual mode to the automatic transmission mode. Thereafter, the transmission mode may be switched to a second instance of the temporary manual mode by the paddle operation by the driver. In this case, the erroneous operation determiner 600 determines to update the switching time when the specific cancel operation is performed for the second time in the second instance of the temporary manual mode. Also, the switching condition updater 310 updates the switching time to the specified cancel time if the specific cancel operation is performed multiple times. Of the two available instances of the second measured time in this case, the time to be adopted as the specified cancel time in this case may be the one from the first instance, the one from the second instance, or the average time of the two.

Note that the determination by the erroneous operation determiner 600 to update the switching time if the specific cancel operation is performed by the driver is not limited to the case in which the specific cancel operation is performed twice in succession. For example, the erroneous operation determiner 600 may determine to update the switching time if the specific cancel operation is performed three or more times. As another example, the erroneous operation determiner 600 may determine to update the switching time in the following situation. Namely, the specific cancel operation is performed for the first time, a return operation other than the specific cancel operation is performed one or more times before the specific cancel operation is performed for the second time, and then the specific cancel operation is performed for the second time.

Also, the erroneous operation determiner 600 determines not to update the switching time if the specific cancel operation is performed for the first time, for example. That is, when the specific cancel operation is performed for the first time, there is a possibility that the driver performed the specific cancel operation by mistake. Therefore, the switching time is not updated to the specified cancel time. In other words, the switching condition updater 310 does not update the switching time to the specified cancel time if the specific cancel operation is performed for the first time.

Figure 11:
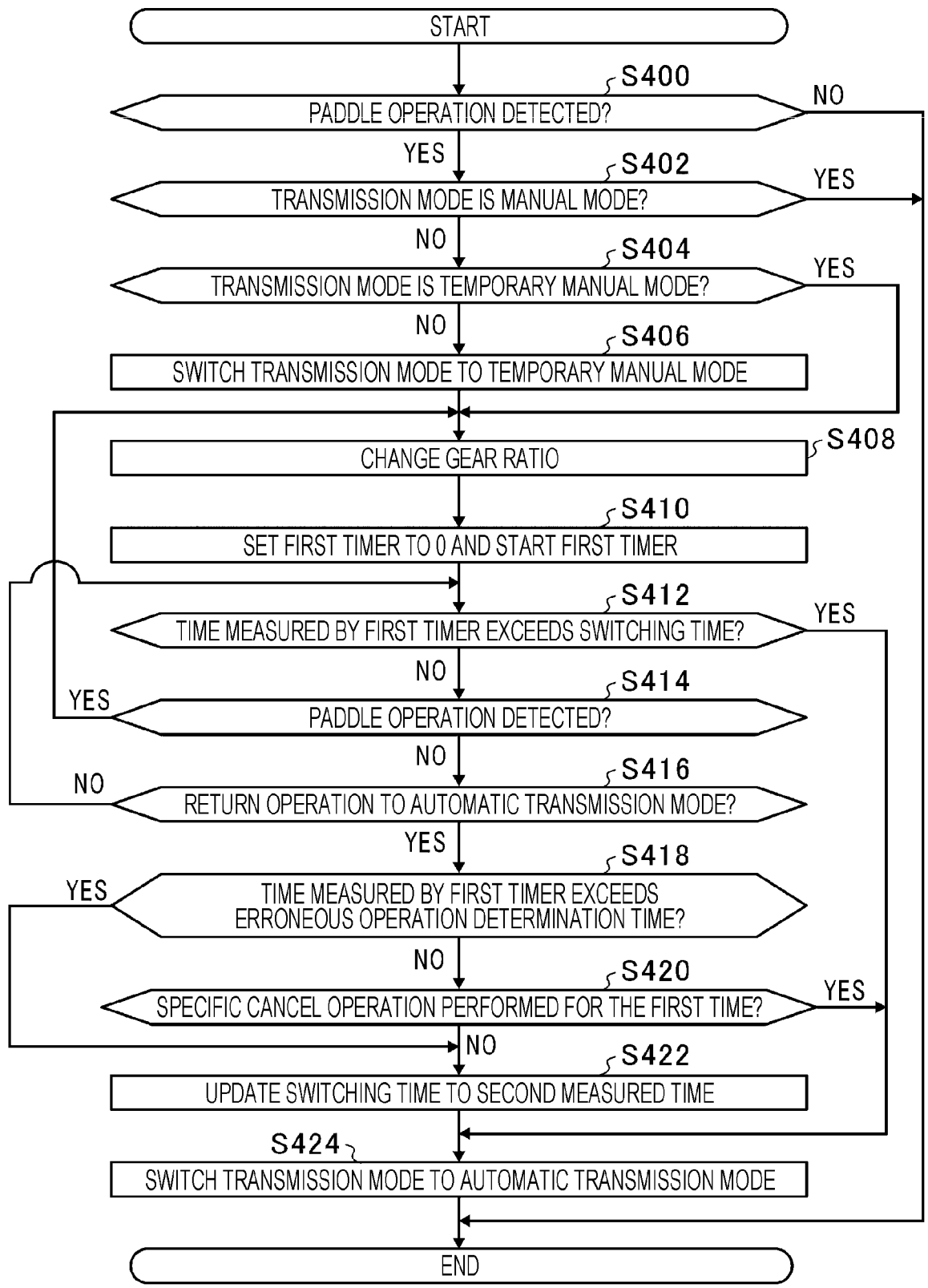
FIG. 11 is a flowchart illustrating a transmission mode switching process by a transmission mode control device according to the embodiment.

10. Process Flow of Transmission Mode Control System According to Fourth Embodiment Next, FIG. 11 will be referenced to describe a process flow by the transmission mode control device 170 of the transmission mode control system according to the fourth embodiment. FIG. 11 is a flowchart illustrating a transmission mode switching process by the transmission mode control device 170 according to the fourth embodiment. Note that the process from step S400 to step S410 illustrated in FIG. 11 is the same as the process from step S300 to step S310 in the transmission mode switching process by the transmission mode control device 170 according to the third embodiment illustrated in FIG. 8. Therefore, a description is omitted.

As illustrated in FIG. 11, after the first timer is started in step S410, the transmission mode switcher 302 determines whether the time measured by the first timer of the timing clock 402 exceeds the switching time (S412). If it is determined that the time measured by the first timer of the timing clock 402 exceeds the switching time (YES in step S412), the process proceeds to step S424. That is, when the switching time elapses after an operation of the paddle switches 150 by the driver, the transmission mode switcher 302 automatically switches the transmission mode from the temporary manual mode to the automatic transmission mode.

If it is determined that the time measured by the first timer of the timing clock 402 does not exceed the switching time (NO in step S412), the paddle operation detector 300 determines whether the paddle operation by the driver is detected based on an operation of the paddle switches 150 by the driver (S414).

In step S414, if it is determined that the paddle operation is detected (YES in step S414), the process repeats from step S408. In step S414, if it is determined that the paddle operation is not detected (NO in step S414), the transmission mode switcher 302 determines whether the return operation has been performed based on an operation of the shift lever 160 by the driver (S416).

In step S416, if it is determined that the return operation has not been performed (NO in step S416), the process repeats from step S412. In step S416, if it is determined that the return operation has been performed (YES in step S416), the erroneous operation determiner 600 determines whether the time measured by the first timer of the timing clock 402 exceeds the erroneous operation determination time (S418). That is, if there is a return operation to the automatic transmission mode and the erroneous operation determination time has elapsed, the return operation to the automatic transmission mode is determined to be the normal return operation. On the other hand, if there is a return operation to the automatic transmission mode and the erroneous operation determination time has not elapsed, the return operation to the automatic transmission mode is determined to be the specific cancel operation.

If it is determined that the time measured by the first timer of the timing clock 402 does not exceed the erroneous operation determination time (NO in step S418), the erroneous operation determiner 600 determines whether the return operation in step S416, that is, the specific cancel operation, is the specific cancel operation for the first time (S420).

If it is determined that the specific cancel operation is not the first time (NO in step S420), or if it is determined in step S418 that the time measured by the first timer of the timing clock 402 exceeds the erroneous operation determination time (YES in step S418), the switching condition updater 310 updates the switching time to the second measured time (S422). In step S422, if the specific cancel operation has been performed two or more times, the switching condition updater 310 updates the switching time to the specified cancel time. The switching condition updater 310 stores the updated switching time in the memory 174, for example.

After the switching time is updated in step S422, or if it is determined in step S412 that the time measured by the first timer of the timing clock 402 exceeds the switching time (YES in step S412), or if it is determined in step S420 that the specific cancel operation is the specific cancel operation for the first time (YES in step S420), the transmission mode switcher 302 switches the transmission mode from the temporary manual mode to the automatic transmission mode (S424), and the transmission mode switching process ends.

As above, in the vehicle 1 of the fourth embodiment, if the specific cancel operation is performed within the erroneous operation determination time after the paddle operation of the paddle switches 150 by the driver, the switching time is not updated to the measured specified cancel time. However, if the specific cancel operation is performed multiple times, the switching time is updated to the specified cancel time. With this arrangement, the switching time is not updated if the driver performs the return operation at a timing earlier than the erroneous operation determination time by mistake. On the other hand, the switching time can be updated to a short time if the driver performs the return operation intentionally at a timing earlier than the erroneous operation determination time. Thus, the intention of the driver can be accurately reflected in the switching time.

Also, in the vehicle 1 of the fourth embodiment, if the driver performs the specific cancel operation multiple times, the switching time is updated to the second measured time. Thus, the switching time can be updated directly to the driver-desired switching time. With this arrangement, the driver is free from the burden of performing the specific cancel operation over and over until the driver finds the switching time that feels optimal. Therefore, the driver burden can be alleviated.

The above describes embodiments of the present disclosure with reference to the accompanying drawings, but obviously the present disclosure is not limited to such embodiments. It is clear that a person skilled in the art could conceive of various modifications or alterations within the scope of the claims, and any such modifications or alterations are naturally understood to also be within the technical scope of the present disclosure.

For example, the vehicle 1 in the above embodiments may be provided with a driver monitoring system using an in-vehicle camera or the like. If there are multiple drivers who drive the vehicle 1, the switching condition updater 310 uses the driver monitoring system to determine which person is the driver who is currently going to drive the vehicle 1. The switching condition updater 310 updates the switching condition for each driver. Also, if there are multiple drivers who drive the vehicle 1, the table storage 312 stores in the memory 174 a switching condition for each driver. With this arrangement, the switching condition is updated for each driver. Thus, even if there are multiple drivers who drive the vehicle 1, the switching condition for switching the transmission mode from the temporary manual mode to the automatic transmission mode is changed for each driver. Accordingly, a switching condition suited to the driver can be selected.

As another example, the above embodiments describe the gear ratio changer 306 as issuing a changing instruction for changing the gear ratio. However, the disclosure is not limited to such an example. The gear ratio changer 306 may also issue a changing instruction for changing the gear steps.

As another example, the above embodiments describe an exemplary configuration of the vehicle 1 illustrated in FIG. 1, but the configuration of a vehicle according to the disclosure is not limited to such an example. For example, a vehicle according to the disclosure may be obtained through the partial removal, addition, or alteration of components with respect to the vehicle 1 illustrated in FIG. 1.

According to the embodiments described above, the road surface conditions determiner 504 is described as determining, based on information from the detector 190, the conditions of the road surface that the vehicle 1 is driving on. However, the disclosure is not limited to such an example. For example, the detector 190 may also determine the conditions of the road surface that the vehicle 1 is driving on.

According to the embodiments described above, the gear ratio change calculator 308 is described as calculating the direction in which the gear ratio has changed. Namely, the gear ratio change calculator 308 subtracts the gear ratio after being changed according to an instruction from the gear ratio changer 306 from the gear ratio when a gear shift is executed according to the paddle operation by the driver. However, the disclosure is not limited to such an example. For example, the gear ratio change calculator 308 may also derive the direction in which the gear ratio has changed directly from the gear ratio when a gear shift is executed according to the paddle operation by the driver. That is, the gear ratio change calculator 308 may derive whether the gear ratio has been changed to a lower speed or a higher speed.

Note that the series of processes by the transmission mode control system according to the embodiments described above may be achieved using any of software, hardware, and a combination of software and hardware. A program constituting software is stored in advance in a non-transitory medium provided internally or externally to each device, for example. Thereafter, the program is then read out from the non-transitory medium (ROM, for example) and loaded into a transitory medium (RAM, for example), and executed by a CPU or other processor, for example.

According to the embodiments described above, it is possible to provide a program for executing the processing of each function of the above transmission mode control system. Furthermore, it is also possible to provide a non-transitory computer-readable recording medium in which the program is stored. The non-transitory recording medium may be a disk-based recording medium, such as an optical disc, a magnetic disk, or a magneto-optical disc, and may also be a semiconductor memory, such as flash memory or USB memory, for example.

According to an embodiment of the disclosure, transmission modes can be switched appropriately.

The transmission mode control device 170 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the transmission mode control device 170 including the paddle operation detector 300, the transmission mode switcher 302, the gear ratio detector 304, the gear ratio changer 306, the gear ratio change calculator 308, the switching condition updater 310, and the table storage 312. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A transmission mode control system to be applied to a vehicle, the transmission mode control system comprising:
   a control device configured to control a transmission mode of the vehicle; and
   a first input device configured to accept a switching operation of switching the transmission mode from an automatic transmission mode, in which a gear shift is executed automatically, to a manual transmission mode, in which a gear shift is executed according to an operation by a driver who drives the vehicle, wherein
   the control device comprises a processor and a memory coupled to the processor, and
   the processor is configured to execute a process comprising
   switching the transmission mode from the manual transmission mode to the automatic transmission mode when a switching time set as a switching condition elapses after an operation of the first input device by the driver, and
   extending the switching time by a set time when the driver performs a certain operation within a post-switching determination time after the switching time elapses, the certain operation causing a gear ratio to change in a same direction as a change of gear ratio when the gear shift is executed in response to the operation by the driver before the switching time elapses.

2. A transmission mode control system to be applied to a vehicle, the transmission mode control system comprising:
   a control device configured to control a transmission mode of the vehicle;
   a first input device configured to accept a switching operation of switching the transmission mode from an automatic transmission mode, in which a gear shift is executed automatically, to a manual transmission mode, in which a gear shift is executed according to an operation by a driver who drives the vehicle; and
   a brake input device configured to accept an operation by the driver for reducing a speed of the vehicle, wherein
   the control device comprises a processor and a memory coupled to the processor, and
   the processor is configured to execute a process comprising
   executing the gear shift to a lower speed according to an operation by the driver in the manual transmission mode,
   switching the transmission mode from the manual transmission mode to the automatic transmission mode when a switching time set as a switching condition elapses after the gear shift is executed, and
   extending the switching time by a set time when the driver operates the brake input device within a post-switching determination time after the switching time elapses.

3. The transmission mode control system according to claim 1, wherein
   the process further comprises
   extending the switching time by the set time every time a time allowed for extension elapses, the time allowed for extension serving as a reference for determining whether to extend the switching time after the transmission mode is switched from the manual transmission mode to the automatic transmission mode.

4. The transmission mode control system according to claim 2, wherein
   the process further comprises
   extending the switching time by the set time every time a time allowed for extension elapses, the time allowed for extension serving as a reference for determining whether to extend the switching time after the transmission mode is switched from the manual transmission mode to the automatic transmission mode.

5. The transmission mode control system according to claim 1, further comprising:
   a detector configured to detect information related to road surface conditions, wherein
   the process further comprises
   storing the switching time for each of the road surface conditions based on the information detected by the detector, and
   setting the switching time according to a road surface condition on which the vehicle is traveling.

6. The transmission mode control system according to claim 2, further comprising:
   a detector configured to detect information related to road surface conditions, wherein
   the process further comprises
   storing the switching time for each of the road surface conditions based on the information detected by the detector, and
   setting the switching time according to a road surface condition on which the vehicle is traveling.

7. A transmission mode control system to be applied to a vehicle, the transmission mode control system comprising:
- a control device configured to control a transmission mode of the vehicle;
- a first input device configured to accept a switching operation of switching the transmission mode from an automatic transmission mode, in which a gear shift is executed automatically, to a manual transmission mode, in which a gear shift is executed according to an operation by a driver who drives the vehicle; and
- a second input device configured to accept a switching operation of switching the transmission mode from the manual transmission mode to the automatic transmission mode, wherein
- the control device comprises a processor and a memory coupled to the processor, and
- the processor is configured to execute a process comprising
- switching the transmission mode from the manual transmission mode to the automatic transmission mode when a switching time set as a switching condition elapses after an operation of the first input device by the driver, and
- updating the switching time to a set cancel time shorter than the switching time when the driver performs a certain cancel operation multiple times within an erroneous operation determination time shorter than the switching time after the operation of the first input device by the driver, the certain cancel operation being an operation of the second input device by the driver.

8. The transmission mode control system according to claim 7, wherein
- the process further comprises
- measuring a measured time until the transmission mode is switched from the manual transmission mode to the automatic transmission mode by an operation of the second input device by the driver after an operation of the first input device by the driver, and
- updating the switching time to the measured time when the set cancel operation is performed multiple times.

* * * * *